United States Patent
Lu et al.

(10) Patent No.: US 12,542,040 B2
(45) Date of Patent: Feb. 3, 2026

(54) SYSTEMS AND METHODS FOR SMOKE DETECTION

(71) Applicant: ZHEJIANG PIXFRA TECHNOLOGY CO., LTD., Zhejiang (CN)

(72) Inventors: Huachao Lu, Hangzhou (CN); Su Liu, Hangzhou (CN); Diquan Xu, Hangzhou (CN); Tao Pu, Hangzhou (CN); Ziwei Wei, Hangzhou (CN); Lianpeng Wu, Hangzhou (CN)

(73) Assignee: ZHEJIANG PIXFRA TECHNOLOGY CO., LTD., Hangzhou (CN)

( * ) Notice: Subject to any disclaimer, the term of this patent is extended or adjusted under 35 U.S.C. 154(b) by 271 days.

(21) Appl. No.: 18/446,503

(22) Filed: Aug. 9, 2023

(65) Prior Publication Data

US 2023/0386315 A1   Nov. 30, 2023

Related U.S. Application Data

(63) Continuation of application No. PCT/CN2021/115857, filed on Sep. 1, 2021.

(30) Foreign Application Priority Data

Feb. 22, 2021   (CN) .......................... 202110199840.5

(51) Int. Cl.
*G08B 17/10*   (2006.01)
*G06T 7/73*   (2017.01)
(Continued)

(52) U.S. Cl.
CPC ................ *G08B 17/10* (2013.01); *G06T 7/73* (2017.01); *G06V 10/25* (2022.01); *G06V 20/52* (2022.01);
(Continued)

(58) Field of Classification Search
CPC ........ G08B 17/10; G08B 17/125; G06T 7/73; G06T 2207/30232; G06T 7/0002;
(Continued)

(56) References Cited

U.S. PATENT DOCUMENTS 10,493,952 B1 * 12/2019 Schwie .................. E05F 15/40
2009/0315722 A1   12/2009 Hou
(Continued)

FOREIGN PATENT DOCUMENTS

CN   110390788 A   10/2019
CN   111145275 A   5/2020
(Continued)

OTHER PUBLICATIONS

International Search Report in PCT/CN2021/115857 mailed on Nov. 25, 2021, 4 pages.
(Continued)

*Primary Examiner* — Omar Casillashernandez
(74) *Attorney, Agent, or Firm* — METIS IP LLC

(57) ABSTRACT

Systems and methods for smoke detection using object detection devices are provided. The object detection device may include a first imaging component and a moveable component configured to move the first imaging component. The system may obtain a current image of a first subject acquired by the first imaging component at a current time. The system may determine whether the first subject and a second subject among one or more second subjects belong to a same object. In response to determining that the first subject and the one of the one or more second subjects belong to the same object, the system may cause the moveable component to move the first imaging component.

18 Claims, 10 Drawing Sheets

(51) Int. Cl.
  *G06V 10/25* (2022.01)
  *G06V 20/52* (2022.01)
  *H04N 23/695* (2023.01)
(52) U.S. Cl.
  CPC . *H04N 23/695* (2023.01); *G06T 2207/30232* (2013.01)
(58) Field of Classification Search
  CPC ........... G06T 7/207; G06T 7/66; G06V 10/25; G06V 20/52; G06V 20/10; H04N 23/695
  USPC ......................................................... 340/628
  See application file for complete search history.

(56) References Cited

U.S. PATENT DOCUMENTS

| | | | |
|---|---|---|---|
| 2012/0126985 A1 | 5/2012 | Au et al. | |
| 2016/0307424 A1* | 10/2016 | Mills | H04N 7/183 |
| 2020/0391059 A1* | 12/2020 | Tanaka | A62C 3/0271 |

FOREIGN PATENT DOCUMENTS

| | | | |
|---|---|---|---|
| CN | 111310636 A | | 6/2020 |
| CN | 111462451 A | | 7/2020 |
| JP | 2008046917 A | | 2/2008 |
| KR | 101224534 | * | 1/2013 |
| KR | 101224534 B1 | | 1/2013 |
| KR | 101798372 B1 | | 11/2017 |
| WO | 2022174573 A1 | | 8/2022 |

OTHER PUBLICATIONS

Written Opinion in PCT/CN2021/115857 mailed on Nov. 25, 2021, 5 pages.
The Extended European Search Report in European Application No. 21926287.0 mailed on May 28, 2024, 10 pages.

* cited by examiner

SYSTEMS AND METHODS FOR SMOKE DETECTION

CROSS-REFERENCE TO RELATED APPLICATIONS

This application is a continuation of International Patent Application No. PCT/CN2021/115857, filed on Sep. 1, 2021, which claims priority of Chinese Patent Application No. 202110199840.5 filed on Feb. 22, 2021, the contents of each of which are hereby incorporated by reference.

TECHNICAL FIELD

The present disclosure generally relates to fire detection technology, and in particular, to systems and methods for smoke detection.

BACKGROUND

In daily life, fire is a great threat to the security of human life and property. Timely detection of fire has a great significance to the protection of the security of human life and property. At present, when smoke is detected in a detection range of a smoke detection device, the smoke detection device may stop moving and perform a fire detection. However, the same smoke may be always detected repeatedly by the smoke detection device when the same smoke is in the detection range, resulting in that the smoke detection device cannot move, thereby decreasing the efficiency of smoke detection. In addition, when different clouds of smoke exist in close regions, the smoke detection device may fail to detect all the clouds of smoke, thereby decreasing the accuracy for smoke detection, and leading to a risk of security. Therefore, it is desirable to provide systems and methods for smoke detection with improved accuracy and efficiency, thereby avoiding a situation that the smoke detection device cannot be moved after smoke is detected and/or one or more clouds of smoke cannot be detected.

SUMMARY

An aspect of the present disclosure relates to a system for smoke detection using an object detection device. The object detection device may include a first imaging component and a moveable component configured to move the first imaging component. The system may include at least one storage device and at least one processor. The at least one storage device may include a set of instructions. The at least one processor may be in communication with the at least one storage device. When executing the set of instructions, the at least one processor may be directed to perform operations. The operations may include obtaining a current image of a first subject acquired by the first imaging component at a current time. The operations may include determining whether the first subject and a second subject among one or more second subjects belong to a same object. The one or more second subjects may be represented in one or more previous images acquired by the first imaging component at a previous time. In response to determining that the first subject and the one of the one or more second subjects belong to the same object, the operations may further include causing the moveable component to move the first imaging component.

In some embodiments, the determining whether the first subject and the second subject belong to the same object may include determining one or more target regions in the previous image; and determining whether the first subject and the second subject belong to the same object based on the one or more target regions. The one or more target regions may include the one or more second subjects.

In some embodiments, the determining whether the first subject and the second subject of the one or more second subjects belong to the same object based on the one or more target regions may include determining first position information of a reference point represented the first subject in the current image; determining second position information of each of the one or more target regions represented one second subject in the previous image; and determining whether the first subject and the second subject belong to the same object based on the first position information and the second position information. The first position information may correspond to current position parameters of the first imaging component acquiring the current image. The second position information may correspond to previous position parameters of the first imaging component acquiring the previous image.

In some embodiments, the determining whether the first subject and the second subject belong to the same object based on the first position information and the second position information may include determining equivalent first position information of the reference point; and determining whether the first subject and the second subject belong to the same object by determining whether the reference point is within one of the one or more target regions based on the equivalent first position information and the second position information. The equivalent first position information may include position information of the reference point if the current image is acquired at the previous position parameters.

In some embodiments, the determining equivalent first position information of the reference point may include determining a difference between the current position parameters and the previous position parameters; and determining the equivalent first position information of the reference point based on the difference between the current position parameters and the previous position parameters.

In some embodiments, the determining whether the first subject and the second subject of the one or more second subjects belong to the same object based on the first position information and the second position information may include determining equivalent second position information of the one or more target regions; and determining whether the first subject and the second subject belong to the same object by determining whether the reference point is within one of the one or more target regions based on the equivalent second position information and the first position information. The equivalent second position information may include position information of the one or more target regions if the previous image is acquired at the current position parameters.

In some embodiments, the determining equivalent second position information may include determining a difference between the current position parameters and the previous position parameters; and determining the equivalent second position information of the one or more target regions based on the difference between the current position parameters and the previous position parameters.

In some embodiments, the determining whether the first subject and the second subject of the one or more second subjects belong to the same object based on the first position information and the second position information may include determining first spatial position information under a reference coordinate system by converting the first position information under a first coordinate system to the reference coordinate system; determining second spatial position information under the reference coordinate system by converting the second position information under a second coordinate system to the reference coordinate system; and determining whether the first subject and the second subject belong to the same object by determining whether the reference point is within one of the one or more target regions based on the first spatial position information and the second spatial position information.

In some embodiments, the operations may further include, in response to determining that the first subject and the second subject belong to different subjects, stopping the moveable component to move the first imaging component.

In some embodiments, the operations may further include, in response to determining that the first subject and the second subject belongs to different subjects, obtaining a second image of the first subject acquired by a second imaging component of the object detection device; determining, based on the second image, whether the first subject is smoke of a combustion; reporting first position information of the first object and the current position parameters in response to determining that the first subject is smoke of the combustion. The second image may include temperature information of the first subject In some embodiments, the operations may further include causing the moveable component to move the first imaging component after the second image of the first subject is acquired by the second imaging component.

In some embodiments, the operations may further include, in response to determining that the first subject and the second subject belong to different subjects, adding the first subject into the one or more second subjects.

In some embodiments, the operations may further include, in response to determining that the first subject and the second subject belong to the same object, updating second position information of the second subject using the first position information of the first subject.

Another aspect of the present disclosure relates to a method for smoke detection using an object detection device. The object detection device may include a first imaging component and a moveable component configured to move the first imaging component. The method may include obtaining a current image of a first subject acquired by the first imaging component at a current time. The method may include determining whether the first subject and a second subject among one or more second subjects belong to a same object. The one or more second subjects may be represented in one or more previous images acquired by the first imaging component at a previous time. In response to determining that the first subject and the one of the one or more second subjects belong to the same object, the method may further include causing the moveable component to move the first imaging component.

In some embodiments, the determining whether the first subject and the second subject belong to the same object may include determining one or more target regions in the previous image; and determining whether the first subject and the second subject belong to the same object based on the one or more target regions. The one or more target regions may include the one or more second subjects.

In some embodiments, the determining whether the first subject and the second subject of the one or more second subjects belong to the same object based on the one or more target regions may include determining first position information of a reference point represented the first subject in the current image; determining second position information of each of the one or more target regions represented one second subject in the previous image; and determining whether the first subject and the second subject belong to the same object based on the first position information and the second position information. The first position information may correspond to current position parameters of the first imaging component acquiring the current image. The second position information may correspond to previous position parameters of the first imaging component acquiring the previous image.

In some embodiments, the determining whether the first subject and the second subject belong to the same object based on the first position information and the second position information may include determining equivalent first position information of the reference point; and determining whether the first subject and the second subject belong to the same object by determining whether the reference point is within one of the one or more target regions based on the equivalent first position information and the second position information. The equivalent first position information may include position information of the reference point if the current image is acquired at the previous position parameters.

In some embodiments, the determining equivalent first position information of the reference point may include determining a difference between the current position parameters and the previous position parameters; and determining the equivalent first position information of the reference point based on the difference between the current position parameters and the previous position parameters.

In some embodiments, the determining whether the first subject and the second subject of the one or more second subjects belong to the same object based on the first position information and the second position information may include determining equivalent second position information of the one or more target regions; and determining whether the first subject and the second subject belong to the same object by determining whether the reference point is within one of the one or more target regions based on the equivalent second position information and the first position information. The equivalent second position information may include position information of the one or more target regions if the previous image is acquired at the current position parameters.

In some embodiments, the determining equivalent second position information may include determining a difference between the current position parameters and the previous position parameters; and determining the equivalent second position information of the one or more target regions based on the difference between the current position parameters and the previous position parameters.

In some embodiments, the determining whether the first subject and the second subject of the one or more second subjects belong to the same object based on the first position information and the second position information may include determining first spatial position information under a reference coordinate system by converting the first position information under a first coordinate system to the reference coordinate system; determining second spatial position information under the reference coordinate system by converting the second position information under a second coordinate system to the reference coordinate system; and determining whether the first subject and the second subject belong to the same object by determining whether the reference point is within one of the one or more target regions based on the first spatial position information and the second spatial position information.

In some embodiments, the method may further include, in response to determining that the first subject and the second subject belong to different subjects, stopping the moveable component to move the first imaging component.

In some embodiments, the method may further include, in response to determining that the first subject and the second subject belongs to different subjects, obtaining a second image of the first subject acquired by a second imaging component of the object detection device; determining, based on the second image, whether the first subject is smoke of a combustion; and reporting first position information of the first object and the current position parameters in response to determining that the first subject is smoke of the combustion. The second image may include temperature information of the first subject.

In some embodiments, the method may further include causing the moveable component to move the first imaging component after the second image of the first subject is acquired by the second imaging component.

In some embodiments, the method may further include, in response to determining that the first subject and the second subject belong to different subjects, adding the first subject into the one or more second subjects.

In some embodiments, the method may further include, in response to determining that the first subject and the second subject belong to the same object, updating second position information of the second subject using the first position information of the first subject.

Still another aspect of the present disclosure relates to a non-transitory computer readable medium. The non-transitory computer readable medium may include executable instructions that, when executed by at least one processor, direct the at least one processor to perform a method for smoke detection using an object detection device. The object detection device may include a first imaging component and a moveable component configured to move the first imaging component. The method may include obtaining a current image of a first subject acquired by the first imaging component at a current time. The method may include determining whether the first subject and a second subject among one or more second subjects belong to a same object. The one or more second subjects may be represented in one or more previous images acquired by the first imaging component at a previous time. The method may further include, in response to determining that the first subject and the one of the one or more second subjects belong to the same object, causing the moveable component to move the first imaging component.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
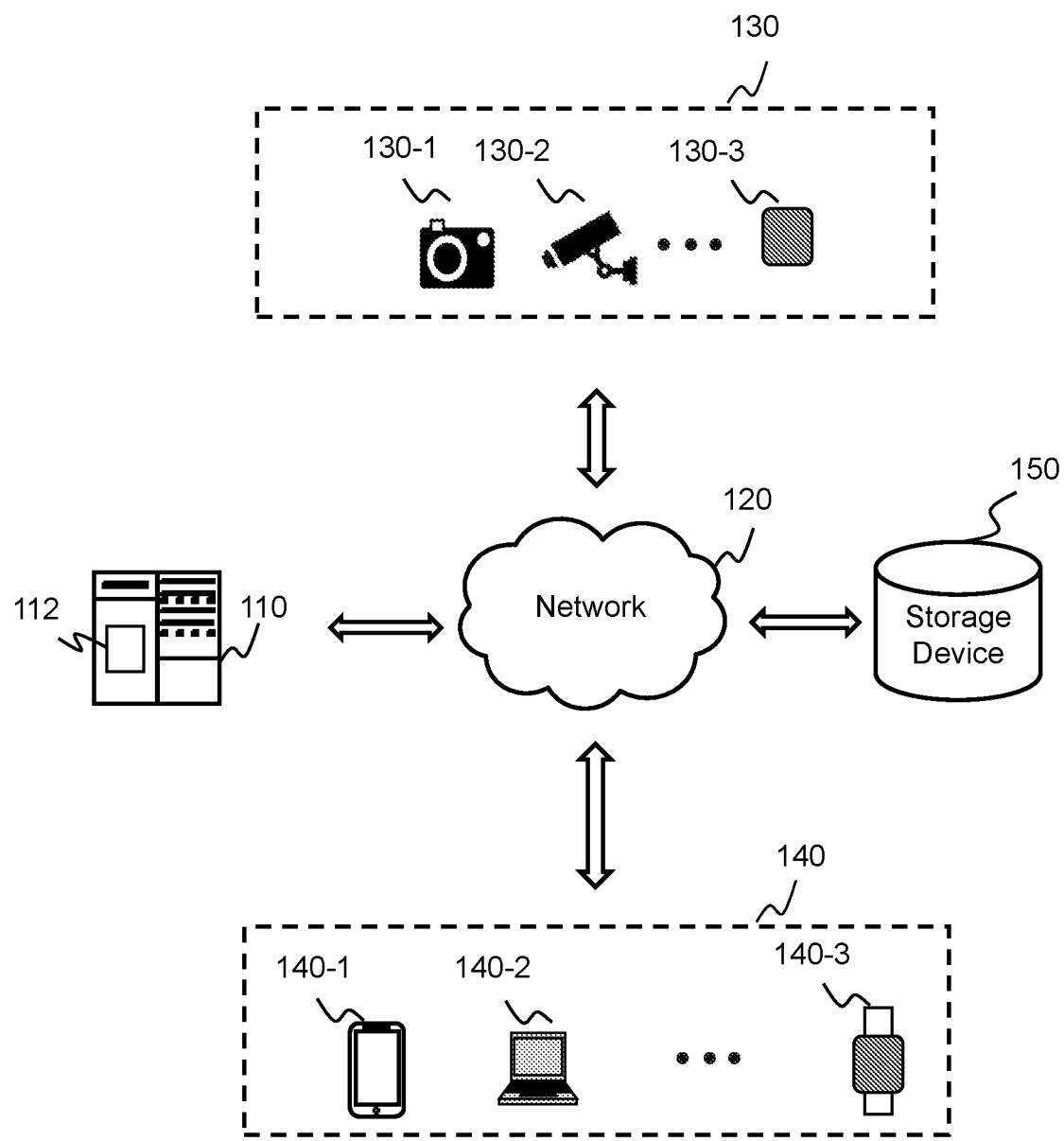
FIG. 1A is a schematic diagram illustrating an exemplary detection system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order.

However, the terms may be displaced by other expressions if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 201 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first," "second," or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

The present disclosure relates to systems and methods for smoke detection using an object detection device. The systems may obtain a current image of a first subject acquired by a first imaging component of the object detection device at a current time. The systems may determine whether the first subject and a second subject among one or more second subjects belong to the same object. The one or more second subjects may be represented in one or more previous images acquired by the first imaging component at a previous time. In response to determining that the first subject and the one of the one or more second subjects belong to the same object, the systems may cause a moveable component of the object detection device to move the first imaging component. In response to determining that the first subject and the second subject belong to different objects, the systems may stop the first imaging component. Therefore, the systems and methods may avoid a situation that the smoke detection device cannot be moved after the same smoke is detected by the and/or one or more clouds of smoke cannot be detected, thereby improving the efficiency and accuracy of smoke detection.

Further, the systems may obtain a second image of the first subject acquired by a second imaging component of the object detection device at the current position. The systems may determine, based on the second image, whether the first subject is smoke of combustion and/or determine a location of the combustion. Therefore, the systems may avoid a false report and improve the accuracy of smoke detection FIG. 1A is a schematic diagram illustrating an exemplary detection system 100 according to some embodiments of the present disclosure. In some embodiments, the detection system 100 may be applied in various application scenarios, for example, smoke detection, fire detection, etc. As shown, the detection system 100 may include a server 110, a network 120, an object detection device 130, a user device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the object detection device 130, the user device 140, and/or the storage device 150 via the network 120. As another example, the server 110 may be directly connected to the object detection device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to monitoring to perform one or more functions described in the present disclosure. For example, the processing device 112 may obtain a current image of a first subject acquired by the object detection device 130 at a current time. The processing device 112 may determine whether the first subject and a second subject among one or more second subjects belong to a same object. The one or more second subjects may be represented in one or more previous images acquired by the first imaging component at a previous time. In response to determining that the first subject and the one of the one or more second subjects belong to the same object, the processing device 112 may cause the object detection device 130 to move. In response to determining that the first subject and the second subject belong to different subjects, the processing device 112 may stop the object detection device 130. Further, the processing device 112 may obtain a second image of the first subject acquired by the object detection device 130. The processing device 112 may determine, based on the second image, whether the first subject is smoke of combustion and/or determine a location of the combustion. In some embodiments, the processing device 112 may include one or more processing devices (e.g., single-core processing device(s) or multi-core processor(s)).

In some embodiment, the server 110 may be unnecessary and all or part of the functions of the server 110 may be implemented by other components (e.g., the object detection device 130, the user device 140) of the detection system 100. For example, the processing device 112 may be integrated into the object detection device 130 or the user device 140 and the functions (e.g., determining one or more target regions in the previous image) of the processing device 112 may be implemented by the object detection device 130 or the user device 140.

The network 120 may facilitate the exchange of information and/or data for the detection system 100. In some embodiments, one or more components (e.g., the server 110, the object detection device 130, the user device 140, the storage device 150) of the detection system 100 may transmit information and/or data to other component(s) of the detection system 100 via the network 120. For example, the server 110 may obtain images (e.g., the current image, the previous image, and/or the second image) from the object detection device 130 via the network 120. As another example, the server 110 may transmit first position information of the first subject and the current position to the user device 140 via the network 120. In some embodiments, the network 120 may be any type of wired or wireless network, or combination thereof.

The object detection device 130 may be configured to acquire the images (e.g., the current image, the previous image, and/or the second image) at different position (e.g., the current position, the previous position, etc.). In some embodiments, the object detection device 130 may include a camera 130-1, a video recorder 130-2, an image sensor 130-3, etc. The camera 130-1 may include a gun camera, a dome camera, an integrated camera, a monocular camera, a binocular camera, a multi-view camera, a visible light camera, a thermal imaging camera, or the like, or any combination thereof. The video recorder 130-2 may include a PC Digital Video Recorder (DVR), an embedded DVR, a visible light DVR, a thermal imaging DVR, or the like, or any combination thereof. The image sensor 130-3 may include a charge coupled device (CCD) image sensor, a complementary metal oxide semiconductor (CMOS) image sensor, or the like, or any combination thereof. In some embodiments, the object detection device 130 may include a plurality of components each of which can acquire an image. For example, the object detection device 130 may include a first imaging component (e.g., a visible light camera) and a second imaging component (e.g., a thermal imaging camera) that can capture a first image (e.g., the current image, the previous image) and a second image, respectively. The first image may include apparent characteristics (e.g., a color, a shape, a boundary, a size, etc.) of a subject (e.g., a smoke). The second image may include temperature information of a subject (e.g., a smoke, a kindling point, a plant). In some embodiments, the object detection device 130 may include a moveable component. The moveable component may be configured to cause at least one portion of the object detection device 130 to move. More descriptions regarding the object detection device 130 may be found elsewhere in the present disclosure (e.g., FIG. 1B and the descriptions thereof). In some embodiments, the object detection device 130 may transmit the acquired image (e.g., the current image, the previous image, and/or the second image) to one or more components (e.g., the server 110, the user device 140, the storage device 150) of the detection system 100 via the network 120.

The user device 140 may be configured to receive information and/or data from the server 110, the object detection device 130, and/or the storage device 150, via the network 120. For example, the user device 140 may receive the images (e.g., the current image, the previous image, and/or the second image) from the object detection device 130. As another example, the user device 140 may receive the first position information of the first subject and the current position from the server 110. In some embodiments, the user device 140 may process information and/or data received from the server 110, the object detection device 130, and/or the storage device 150, via the network 120. In some embodiments, the user device 140 may provide a user interface via which a user may view information and/or input data and/or instructions to the detection system 100. For example, the user may view the images (e.g., the current image, the previous image, and/or the second image) via the user interface. As another example, the user may input an instruction associated with the smoke detection via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light-emitting diode (LED) display, a plasma display panel (PDP), a three-dimensional (3D) display, or the like, or a combination thereof.

The storage device 150 may be configured to store data and/or instructions. The data and/or instructions may be obtained from, for example, the server 110, the object detection device 130, and/or any other component of the detection system 100. In some embodiments, the storage device 150 may store data and/or instructions that the server 110 may execute or use to perform exemplary methods described in the present disclosure. In some embodiments, the storage device 150 may include a mass storage, a removable storage, a volatile read-and-write memory, a read-only memory (ROM), or the like, or any combination thereof. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the object detection device 130, the user device 140) of the detection system 100. One or more components of the detection system 100 may access the data or instructions stored in the storage device 150 via the network 120. In some embodiments, the storage device 150 may be directly connected to or communicate with one or more components (e.g., the server 110, the object detection device 130, the user device 140) of the detection system 100. In some embodiments, the storage device 150 may be part of other components of the detection system 100, such as the server 110, the object detection device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 1B:
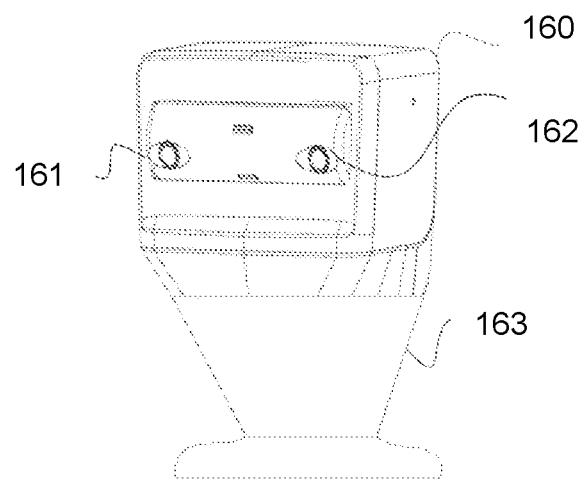
FIG. 1B is a schematic diagram illustrating an exemplary object detection device according to some embodiments of the present disclosure.

FIG. 1B is a schematic diagram illustrating an exemplary object detection device 160 according to some embodiments of the present disclosure. In some embodiments, the object detection device 160 may be an exemplary embodiment of the object detection device 130 illustrated in FIG. 1A.

As shown in FIG. 1B, the object detection device 160 may include a first imaging component 161, a second imaging component 162, and a moveable component 163. It should be noted that the descriptions of the single first imaging component 161, the single second imaging component 162, and/or the single moveable component 163 as shown in FIG. 1B are merely provided for illustration, and not intended to limit the scope of the present disclosure. In addition, the arrangement of the first imaging component 161, the second imaging component 162, and the moveable component 163 as shown in FIG. 1B is merely provided for illustration, and not intended to limit the scope of the present disclosure. It is understood that the object detection device 160 may include more than one first imaging component, more than one second imaging component, and/or more than one moveable component, and the first imaging component, the second imaging component, and the moveable component may be arranged in other arrangements. For example, more than one first imaging component and/or more than one second imaging component may be arranged around the moveable component 163, respectively.

The first imaging component 161 may be configured to acquire one or more first images representing a scene in a detection range (i.e., a field view) of the first imaging component.

In some embodiments, the first image acquired by the first imaging component 161 may represent or describe apparent characteristics and/or position information of one or more subjects in the detection range of the first imaging component 161. The apparent characteristics of a subject may include the size, boundary, shape, color, etc., of the subject. The position information of a subject in the detection range of the first imaging component 161 may be determined based on the position information of the subject in the first image. The position information of the subject in the first image may be defined by a coordinate system applied to the first image or the first imaging component 161 that is associated with a position of the first imaging component 161. If the position of the first imaging component 161 changes, the coordinate system applied to the first imaging component 161 may change.

In some embodiments, the first imaging component 161 may include a visual imaging device, e.g., a camera, a video recorder, an image sensor, etc. Exemplary cameras may include a gun camera, a dome camera, an integrated camera, a monocular camera, a binocular camera, a multi-view camera, or the like, or any combination thereof. Exemplary video recorders may include a personal computer (PC) digital video recorder (DVR), an embedded DVR, a visible light DVR, or the like, or any combination thereof. Exemplary image sensors may include a charge-coupled device (CCD) image sensor, a complementary metal-oxide-semiconductor (CMOS) image sensor, or the like, or any combination thereof. In some embodiments, the first imaging component 161 may include a thermal imaging device, e.g., a thermal imaging camera, a thermal imaging DVR, or the like, or any combination thereof. The thermal imaging device may include a thermal imaging device with a cooled infrared image detector and a thermal imaging device with an uncooled detector.

The second imaging component 162 may be configured to obtain a second image representing a scene in a detection range (or a field view) of the second imaging component 162. The second image may include temperature information and/or position information of one or more subjects in the detection range of the second imaging component 162. The position information of a subject in the detection range of the second imaging component 162 may be determined based on position information of the subject in the second image. The position information of the subject in the second image may be defined by a coordinate system applied to the second image or the second imaging component 162 that is associated with a position of the second imaging component 162. If the position of the second imaging component 162 changes, the coordinate system applied to the first imaging component 162 may change.

In some embodiments, the second imaging component 162 may include a thermal imaging device, e.g., a thermal imaging camera, a thermal imaging DVR, or the like, or any combination thereof. The thermal imaging device may include a thermal imaging device with a cooled infrared image detector and a thermal imaging device with an uncooled detector.

In some embodiments, the same subject may be represented in the first image and the second image acquired by the first imaging component 161 and the second imaging component 162 at the same time substantially. The position information of the same subject represented in the second image may be determined by converting the position information of the same subject represented in the first image using a transforming relationship between the coordinate system applied to the first imaging component 161 and the coordinate system applied to the second imaging component 162. The transforming relationship between the coordinate system applied to the first imaging component 161 and the coordinate system applied to the second imaging component 162 may be associated with a position relationship between the first imaging component 161 and the second imaging component 162. The transforming relationship between the coordinate system applied to the first imaging component 161 and the coordinate system applied to the second imaging component 162 may be a default setting of the system 100. For example, the transforming relationship between the coordinate system applied to the first imaging component 161 and the coordinate system applied to the second imaging component 162 may be denoted or updated according to calibration parameters of the first imaging component 161 and the second imaging component 162 that are related to the position relationship between the first imaging component 161 and the second imaging component 162.

In some embodiments, the first imaging component 161 may be fixed on the second imaging component 162 and/or the moveable component 163 through a connection, such as a glue connection, a welding connection, a thread connection, a socket connection, a groove connection, or the like, or any combination thereof.

In some embodiments, the second imaging component 162 may be fixed on the first imaging component 161 and/or the moveable component 163 through a connection, such as a glue connection, a welding connection, a thread connection, a socket connection, a groove connection, or the like, or any combination thereof.

In some embodiments, the first imaging component 161 and the second imaging component 162 may be mounted on the same mounted part, and the same mounted part may be mounted on the moveable component 163 through a connection. In some embodiments, the first imaging component 161 and the second imaging component 162 may be mounted on different mounted parts, and the different mounted parts may be mounted on the moveable component 163 through connections, respectively.

In some embodiments, the detection range (i.e., the field of view) of the first imaging component 161 and the detection range of the second imaging component 162 may be substantially the same. In some embodiments, an overlapping degree between the detection range of the first imaging component 161 and the detection range of the second imaging component 162 may be larger than or equal to an overlapping threshold. As used herein, the overlapping degree between the detection range of the first imaging component and the detection range of the second imaging component refers to a ratio of an area of an overlapping region between the detection range of the first imaging component and the detection range of the second imaging component to one of the areas of the detection range of the first imaging component and the detection range of the second imaging component. The overlapping threshold may indicate a minimum overlapping degree that the one or more subjects in the detection range of the second imaging component may be the same as the one or more subjects in the detection range of the first imaging component as much as possible. In some embodiments, the overlapping threshold may be 50%, 60%, 70%, 80%, 90%, 100%, etc. For example, before a process of smoke detection, the detection range of the first imaging component and/or the detection range of the second imaging component may be adjusted so that the overlapping degree between the detection range of the first imaging component and the detection range of the second imaging component may be larger than or equal to the overlapping threshold. During the process of smoke detection, the first imaging component and the second imaging component may remain relatively static. As another example, the first imaging component and/or the second imaging component may be adjusted automatically during a process of smoke detection, so that the overlapping degree between the detection range of the first imaging component and the detection range of the second imaging component may be larger than or equal to the overlapping threshold.

In some embodiments, the first imaging component 161 and the second imaging component 162 may simultaneously acquire a first image and a second image of the same scene, respectively. In some embodiments, a period between a time that the first image is acquired by the first imaging component 161 and a time that the second image is acquired by the second imaging component 162 may be less than a time threshold. The time threshold may indicate a maximum period that the one or more subjects in the detection range of the second imaging component may be the same as the one or more subjects in the detection range of the first imaging component. In some embodiments, the time threshold may be 1 second, 0.5 seconds, 0.3 seconds, 0.2 seconds, 0.1 seconds, etc. In some embodiments, the second imaging component 162 may acquire a second image in response to determining that smoke is detected from the first image acquired by the first imaging component 161.

The moveable component 163 may be configured to support and/or move at least a portion of the object detection device 160. In some embodiments, the moveable component 163 may be configured to drive the first imaging component 161 and/or the second imaging component 162 to move. For example, the moveable component 163 may drive the first imaging component 161 and/or the second imaging component 162 to rotate a certain angle (e.g., 360 degrees, 180 degrees, 90 degrees, etc.). As another example, the moveable component 163 may drive the first imaging component 161 and/or the second imaging component 162 to move in a vertical direction (e.g., up-and-down). As still another example, the moveable component 163 may drive the first imaging component 161 and/or the second imaging component 162 to move in a horizontal direction. In some embodiments, the moveable component 163 may be configured to drive the object detection device 160 to move to a position (e.g., the current position, the previous position, etc.). For example, the moveable component 163 may drive the object detection device 160 to move in a target region. As another example, the moveable component 163 may drive the object detection device 160 to move along a detection route.

In some embodiments, the movement of the first imaging component 161 and/or the second imaging component 162 may change the detection range of the first imaging component 161 and/or the second imaging component 162. In some embodiments, the position of the moveable component 163 may not change, but the detection range of the first imaging component 161 and/or the second imaging component 162 may change. For example, when the moveable component 163 drives the first imaging component 161 and/or the second imaging component 162 to move along the vertical direction or rotate in a horizontal plane, the position of the moveable component 163 may not change, but the detection range of the first imaging component 161 and/or the second imaging component 162 may change. In some embodiments, the positions of the first imaging component 161 and/or the second imaging component 162 may not change, the detection range of the first imaging component 161 and/or the second imaging component 162 may change. For example, when the moveable component 163 drives the first imaging component 161 and/or the second imaging component 162 to rotate in a horizontal plane, the position of the moveable component 163 may not change, the detection range of the first imaging component 161 and/or the second imaging component 162 may change.

In some embodiments, the moveable component 163 may include at least one driving member and at least one transmission member. Exemplary driving members may include a pneumatic driving member, a hydraulic driving member, an electric driving member, a mechanical driving member, or the like, or any combination thereof. Exemplary transmission members may include a turntable, a belt, a chain, a shaft, a bearing, or the like, or any combination thereof. Merely by way of example, the moveable component 163 may include a tripod head. The tripod head may be a support device configured to fix one or more imaging components. Exemplary tripod heads may include a fixed tripod head and a mobile tripod head. The fixed tripod head may be arranged on a carrier (e.g., a cart, a trolley, an unmanned aerial vehicle, etc.) so that the moveable component 163 may be driven, by the carrier, to move to different positions. The mobile tripod head may include a driving member configured to drive the first imaging component 161 and/or the second imaging component 162 to move to different positions.

It should be noted that the description of the object detection device 160 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the object detection device 160 may include a controller configured to control the first imaging component 161, the second imaging component 162, and/or the moveable component 163. As another example, the object detection device 160 may include a thermometer. The thermometer may be configured to assist the second imaging component 162 to determine a temperature of the subject.

Figure 2:
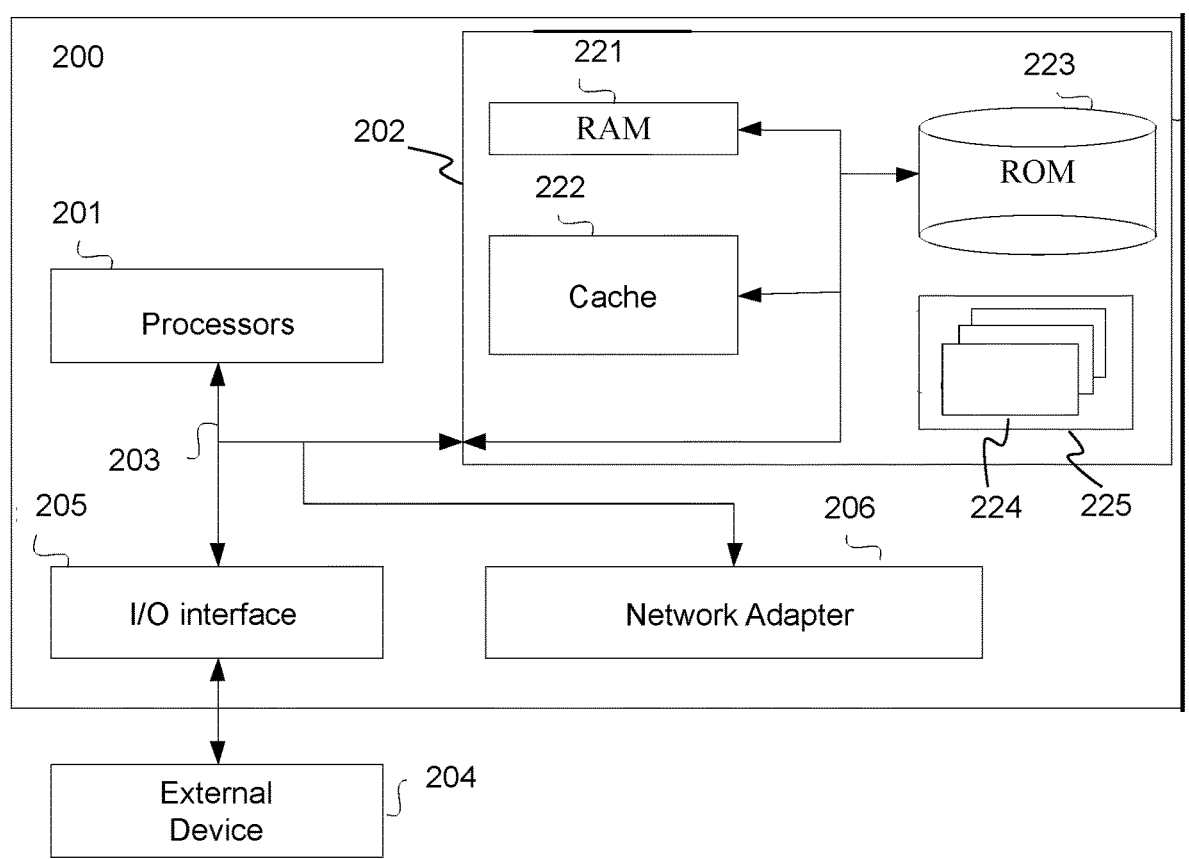
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device 200 according to some embodiments of the present disclosure. In some embodiments, the server 110 may be implemented on the computing device 200. For example, the processing device 112 may be implemented on the computing device 200 and configured to perform methods as disclosed in this disclosure. It should be noted that the description of the computing device 200 in FIG. 2 is intended to be illustrative, and not to limit the scope of the present disclosure.

As illustrated in FIG. 2, the computing device 200 may include one or more processors 201, at least one storage 202, a bus 203, or the like, or any combination thereof.

The bus 203 may be configured to connect other components in the computing device 200 (e.g., the one or more processors 201, the storage 202, etc.). The bus 203 may represent one or more bus structures. Exemplary bus structures may include a memory bus, a memory controller, a peripheral bus, a graphical acceleration port, a processor, or a local bus that uses any of several bus structures. For example, these bus structures may include an industry standards architecture (ISA) bus, a microchannel architecture (MAC) bus, an enhanced ISA bus, a video electronics standards association (VESA) local bus, a peripheral component interconnection (PCI) bus, or the like, or any combination thereof.

The one or more processors 201 may execute computer instructions (e.g., program codes) and perform functions of the processing device 112 in accordance with techniques described herein. The computer instructions may include, for example, routines, programs, objects, components, data structures, procedures, modules, etc., which perform particular functions described herein. For example, the one or more processors 201 may process data obtained from the server 110, the object detection device 130, the user device 140, the storage device 150, and/or any other component of the detection system 100. In some embodiments, the one or more processors 201 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The at least one storage 202 may store data/information obtained from the server 110, the object detection device 130, the user device 140, the storage device 150, and/or any other component of the detection system 100. The storage 202 may include a computer readable medium in the form of a volatile memory, such as a random access memory (RAM) 221 and/or a cache memory 222. The at least one storage 202 may further include a read-only memory (ROM) 223.

The at least one storage 202 may include a program/utility 225 including at least one set of program modules 224. Such a program module 224 may include, but not be limited to, an operating system, one or more applications, other program modules, program data, etc. Each or some combination of these embodiments may include an implementation of a network environment. The program module 224 may perform functions and/or methods described in the embodiments of the present disclosure.

The computing device 200 may communicate with one or more external devices 204 (e.g., a keyboard, a pointing device, a display, etc.). The computing device 200 may communicate with one or more devices that enable a user to interact with the computing device 200, and/or with any device (e.g., a network card, a modem, etc.) that enables the computing device 200 to communicate with one or more other computing devices. The communication may be performed through an input/output (I/O) interface 205. In addition, the computing device 200 may also communicate with one or more networks (e.g., a local area network (LAN), a wide area network (WAN), and/or a public network, such as the Internet) through a network adapter 206. As shown in FIG. 2, the network adapter 206 may communicate with other modules of the computing device 200 through the bus 203. It should be noted that, although not shown in FIG. 2, other hardware and/or software modules may be used in accordance with the computing device 200. The hardware and/or software modules may include, but not be limited to, a microcode, a device driver, a redundant processing unit, a drive array of external disks, a redundant array of independent disks (RAID) system, a tape drive, a data backup storage device, or the like, or any combination thereof. It may be considered that those skilled in the art may also be familiar with such structures, programs, or general operations of this type of computing device.

Figure 3:
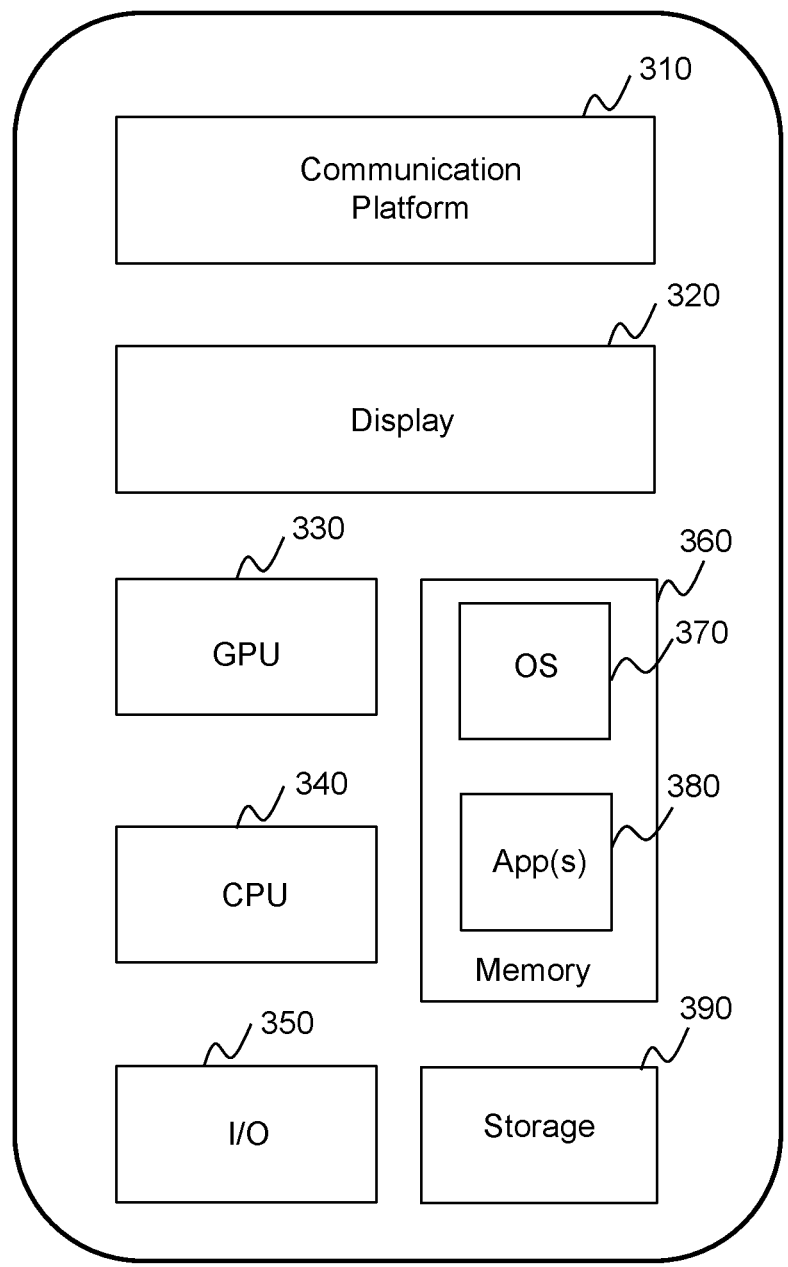
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 according to some embodiments of the present disclosure. In some embodiments, the user device 140 may be implemented on the mobile device 300 shown in FIG. 3.

As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to monitoring or other information from the processing device 112. User interactions may be achieved via the I/O 350 and provided to the processing device 112 and/or other components of the detection system 100 via the network 120.

Figure 4:
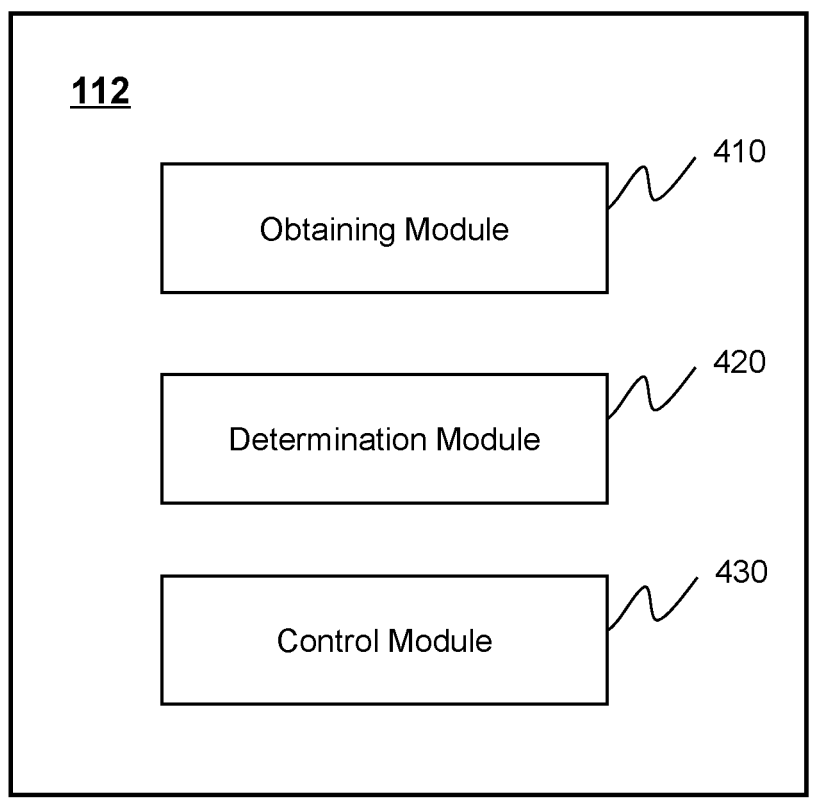
FIG. 4 is a block diagram illustrating an exemplary processing device according to some embodiments of the present disclosure.

FIG. 4 is a block diagram illustrating an exemplary processing device according to some embodiments of the present disclosure. The processing device 112 may include an obtaining module 410, a determination module 420, and a control module 430.

The obtaining module 410 may be configured to obtain a current image of a first subject acquired by a first imaging component (e.g., the first imaging component 161, the object detection device 130) at a current time. More descriptions regarding the obtaining of the current image may be found elsewhere in the present disclosure, for example, operation 502 in FIG. 5 and relevant descriptions thereof.

The determination module 420 may be configured to determine whether the first subject and a second subject among one or more second subjects belong to the same object. The one or more second subjects may be represented in one or more previous images acquired by the first imaging component at a previous time. More descriptions regarding determining whether the first subject and the second subject among the one or more second subjects belong to the same object may be found elsewhere in the present disclosure, for example, operation 504 in FIG. 5 and relevant descriptions thereof.

The control module 430 may be configured to cause the moveable component to move the first imaging component in response to determining that the first subject and the one of the one or more second subjects belong to the same object. Alternatively or additionally, the control module 430 may be configured to stop the moveable component to move the first imaging component in response to determining that the first subject and the one of the one or more second subjects belong to different subjects. More descriptions regarding the causing or stopping the moveable component to move the first imaging component may be found elsewhere in the present disclosure, for example, operation 506 or operation 508 in FIG. 5 and relevant descriptions thereof.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units. For example, the obtaining module 410 may be divided into two sub-obtaining modules 410-1 and 410-2. The sub-obtaining modules 410-1 may be configured to obtain the current image of the first subject. The sub-obtaining modules 410-2 may be configured to obtain the previous image of one or more second subjects. In some embodiments, the processing device 112 may include one or more additional modules. For example, the processing device 112 may also include a transmission module configured to transmit signals (e.g., electrical signals, electromagnetic signals) to one or more components (e.g., the object detection device 130, the user device 140) of the detection system 100. As another example, the processing device 112 may include a storage module (not shown) used to store information and/or data (e.g., the current image of the first subject, the previous image of the one or more second subjects, etc.).

Figure 5:
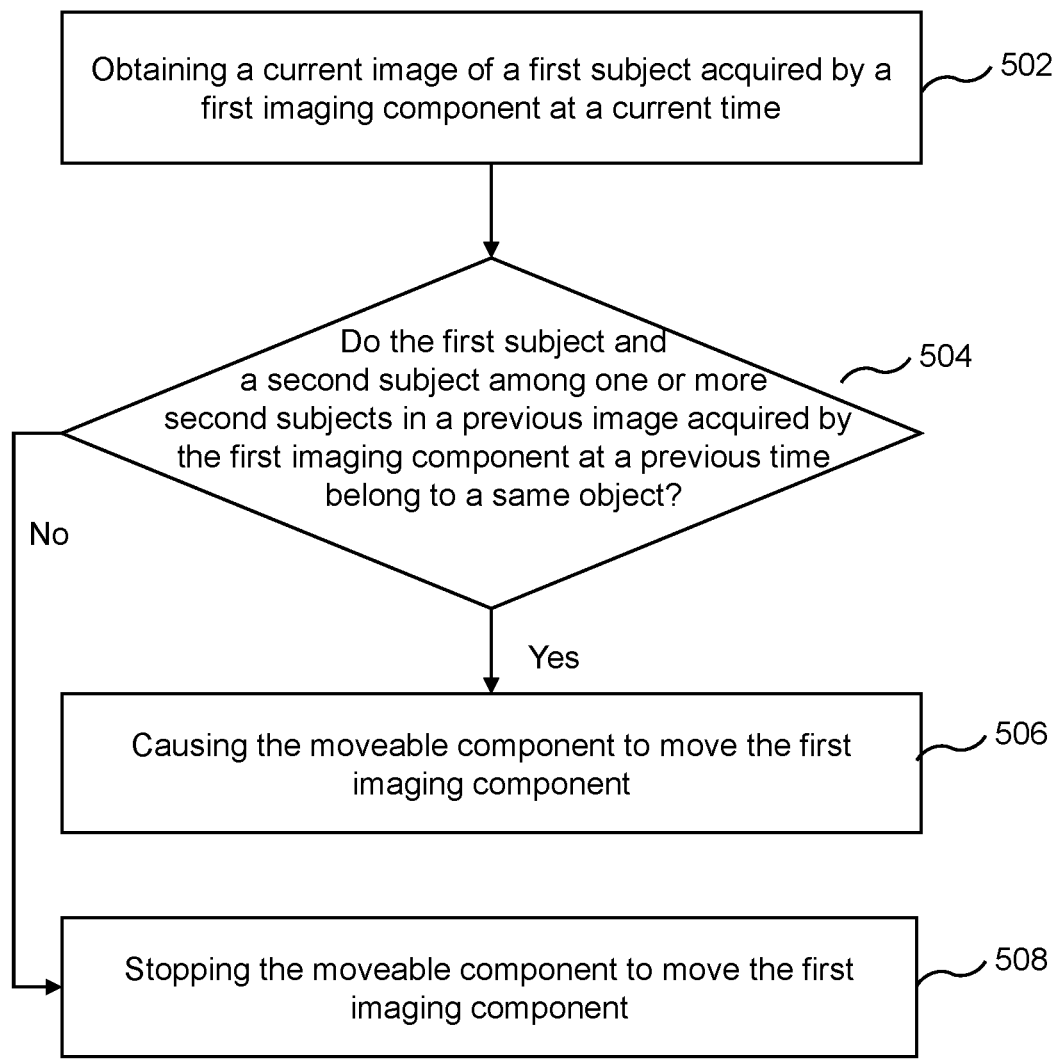
FIG. 5 is a flowchart illustrating an exemplary process for smoke detection according to some embodiments of the present disclosure.

FIG. 5 is a flowchart illustrating an exemplary process for smoke detection according to some embodiments of the present disclosure. In some embodiments, process 500 may be executed by the detection system 100. For example, the process 500 may be implemented as a set of instructions (e.g., an application) stored in a storage device (e.g., the storage device 150, the ROM 223, the RAM 221, and/or the storage 390). In some embodiments, the processing device 112 (e.g., the processor 201 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 502, the processing device 112 (e.g., the obtaining module 410) may obtain a current image of a first subject acquired by a first imaging component of an object detection device at a current time.

The first subject may be a target subject that needs to be detected using the object detection device. For example, in a smoke detection scenario, the first subject may indicate a smoke. It should be noted that, in other detection scenarios, the first subject may indicate other target subjects, such as, pollutants in a river, etc. In some embodiments, there may be a plurality of first subjects in the current image. The first imaging component may be configured to acquire one or more first images of one or more subjects that may represent apparent characteristics of each of the one or more subjects. The object detection device may include the first imaging component, a second imaging component, and a moveable component. More descriptions regarding the first imaging component and the object detection device may be found in elsewhere in the present disclosure, for example, FIGS. 1A and 1B and relevant descriptions thereof.

The current time may refer to a time point or period during the image acquisition of the first imaging component or object detection. In some embodiments, the processing device 112 may obtain multiple first images from the first imaging component periodically (e.g., every 1 second, every 2 seconds, every 4 seconds, etc.) that are acquired by the first component in the current time. The processing device 112 may determine whether the first subject is included in each of at least a portion the multiple first images using an imaging recognition algorithm. In response to determining that the first subject is included in the first image, the processing device 112 may determine the first image as the current image. For instance, in a smoke detection scenario, the imaging recognition algorithm may indicate a smoke detection algorithm, such as, a smoke detection algorithm based on color segmentation, a smoke detection algorithm based on motion segmentation, a smoke detection algorithm based on color segmentation, a smoke detection algorithm based on texture, a smoke detection algorithm based on histogram of oriented gradients (HOG), etc. In response to determining that no first subject is included in the first image, the processing device 112 may cause the first imaging component to acquire a next first image.

In some embodiments, the processing device 112 may obtain the first image from the first imaging component in real time after the first image is acquired by the first imaging component at the current time. The processing device 112 may determine whether the first subject is represented in the first image using the imaging recognition algorithm. In response to determining that the first subject is included in the first image, the processing device 112 may determine the first image as the current image. In response to determining that the first subject is not included in the first image, the processing device 112 may cause the first imaging component to acquire a next first image.

In some embodiments, the first images may be acquired during the movement of the first imaging component. In response to determining that the first subject is not included in the first image, the processing device 112 may cause the moveable component to keep the movement of the first imaging component until the current image including the first subject is acquired by the first imaging component. In response to determining that the first subject is included in one of the first images or the first image, the processing device 112 may cause the moveable component to stop the movement of the first imaging component.

In some embodiments, the processing device 112 may obtain or determine the current image of the first subject from a video captured by the first imaging component in the current time. For example, the processing device 112 may perform a framing operation on the video to obtain a plurality of frames in the video. The processing device 112 may designate the plurality of frames as the one or more first images. The processing device 112 may obtain or determine the current image of the first subject from the one or more first images.

In some embodiments, the one or more first images may be acquired by the first imaging component, and the processing device 112 may obtain the current image from the first imaging component. In some embodiments, the one or more first images may be acquired by the first imaging component and stored in a storage device (e.g., the storage device 150, the ROM 224, the RAM 221, and/or the storage 390). The processing device 112 may obtain the current image from the storage device via a network (e.g., the network 120).

In 504, the processing device 112 (e.g., the determination module 420) may determine whether the first subject and a second subject among the one or more second subjects belong to a same object, the one or more second subjects being represented in one or more previous images acquired by the first imaging component at a previous time.

The second subject may refer to a target object that has been detected. A type of the second subject may be the same as a type of the first subject. For example, in the smoke detection scenario, the second subject may also indicate a smoke. In some embodiments, the second subject may include smokes in the one or more previous images. For example, the smokes may include a smoke that has been reported (i.e., a smoke of a combustion) and/or a smoke that is not on fire in the one or more previous images acquired before the current image.

The previous time may refer to a time point or period before the current time during the image acquisition of the first imaging component or object detection.

In some embodiments, the processing device 112 may determine first position information of the first subject in the current image, obtain second position information of each of the one or more second subjects in the previous image, and determine whether the first subject and one of the one or more second subjects belong to the same object based on the first position information of the first subject and the second position information. In some embodiments, the first position information of the first subject in the current image may include position information of the boundary of the first subject (e.g., positions of one or more points on the boundary), a position of the center point of the first subject, etc., in the current image. In some embodiments, the second position information of the second subject in the current image may include position information of the boundary of the second subject (e.g., positions of one or more points on the boundary), a position of the center point of the second subject, etc., in the previous image.

In some embodiments, the processing device 112 may obtain the previous image from a storage device (e.g., the storage device 150, the ROM 223, the RAM 221, and/or the storage 390) via a network (e.g., the network 120). For example, the previous image may be previously stored in the storage device. The processing device 112 may obtain the previous image from the storage device via the network. The processing device 112 may determine the second position information of each of the one or more second subjects based on the previous image. In some embodiments, the processing device 112 may obtain the second position information of each of the one or more second subjects from a storage device (e.g., the storage device 150, the ROM 223, the RAM 221, and/or the storage 390) via a network (e.g., the network 120). For example, the second position information of each of the one or more second subjects may be previously stored in the storage device (e.g., a database) after the one or more second subjects are detected from the previous image. The processing device 112 may obtain the second position information from the storage device via the network. More descriptions for the second position information may be found elsewhere in the present disclosure.

In some embodiments, the processing device 112 may convert the first position information of the first subject in the current image into first spatial position information of the first subject in a spatial space. The processing device 112 may convert the second position information of the second subject in the previous image into second spatial position information of the second subject in the spatial space. For example, the first spatial position information of the first subject and the second spatial position information of a second subject may be denoted by a same reference coordinate system (e.g., a geographic coordinate system, a word coordinate system). In some embodiments, the first spatial position information of the first subject may include coordinates of one or more reference points of the first subject (e.g., points on the boundary of the first subject, a center point of the first subject) denoted by the reference coordinate system; the second spatial position information of a second subject may include coordinates of one or more reference points of the second subject (e.g., points on the boundary of the second subject, a center point of the second subject) denoted by the reference coordinate system.

In some embodiments, the processing device 112 may compare the first spatial position information of the first subject and the second spatial position information of each second subject and determine whether the first subject and one of the one or more second subjects belong to the same object based on a comparison result. In some embodiments, the processing device 112 may compare the first spatial position information of the first subject and the second spatial position information of each second subject by determining a distance between the first spatial position information of the first subject and the second spatial position information of each second subject. For example, the processing device 112 may determine a distance between the center point of the first subject and the center point of the second subject in the reference coordinate system based on the first spatial position information and the second spatial position information. The processing device 112 may determine that the first subject and the second subject belong to the same object if the distance between the center point of the first subject and the center point of the second subject exceeds a distance threshold. In some embodiments, the distance between the first spatial position information of the first subject and the second spatial position information of a second subject may be denoted by a similarity between the first spatial position information of the first subject and the second spatial position information of the second subject. The greater the similarity is, the smaller the distance may be. In some embodiments, the processing device 112 may determine that the first subject and one of the one or more second subjects belong to the same object if the similarity between the first spatial position information of the first subject and the second spatial position information of a second subject exceeds a similarity threshold. In some embodiments, the processing device 112 may compare the first spatial position information of the first subject and the second spatial position information of each second subject by determining whether the center point of the first subject is within a region defined by the boundary of the second subject and/or the center point of the second subject is within a region defined by the boundary of the first subject in the reference coordinate system. The processing device 112 may determine that the first subject and the second subject belong to the same object if the center point of the first subject is within the region defined by the boundary of the second subject and/or the center point of the second subject is within the region defined by the boundary of the first subject.

In some embodiments, the processing device 112 may determine the first spatial position information of the first subject and the second spatial position information of a second subject in the reference coordinate system based on the first position information of the first subject in the current image and the second position information of each second subject in the previous image, respectively. In some embodiments, the processing device 112 may determine the first spatial position information of the first subject in the reference coordinate system by converting the first spatial position information of the first subject in the current image using a first transforming relationship (e.g., a transforming matrix) between the reference coordinate system and a first coordinate system applied to the current image. The processing device 112 may determine the second spatial position information of the second subject in the reference coordinate system by converting the second position information of the second subject in the previous image using a second transforming relationship (e.g., a transforming matrix) between the reference coordinate system and a second coordinate system applied to the previous image. A transforming relationship (e.g., the first transforming relationship, the second transforming relationship) between the reference coordinate system and a coordinate system (e.g., the first coordinate system, the second coordinate system) applied to an image (e.g., the current image, the previous image) may be denoted by calibration parameters of an imaging component (e.g., the first imaging component) that may be associated with position parameters of the first imaging component (e.g., coordinates of the first imaging component in the reference coordinate system, a direction of an optical axis of the first imaging component, a position of the optical center of the first imaging component). The position parameters of the first imaging component for acquiring the current image and the previous image may be different. If the first imaging component moves (i.e., rotation, movement in the horizontal plane or the vertical plane), the position parameters of the first imaging component may change, and the transforming relationship between the reference coordinate system and the coordinate system applied to the image may change. In some embodiments, a changing relationship between the position parameters of the first imaging component and the transforming relationship between the reference coordinate system and the coordinate system applied to the image may be a default setting of the system 100. The processing device 112 may determine the first transforming relationship and/or the second transforming relationship based on the changing relationship between the position parameters of the first imaging component and the transforming relationship between the reference coordinate system and the coordinate system applied to the image and the position parameters of the first imaging component for acquiring the current image and/or the previous image.

In some embodiments, the processing device 112 may determine equivalent first position information of the first subject based on the first position information of the first subject in the current image, and determine whether the first subject and the second subject belong to the same object based on the equivalent first position information and the second position information. The equivalent first position information may include position information of the first subject in the current image if the first imaging component acquires the current image with the position parameters the same as the position parameters for acquiring the previous image (also referred as position information of the first subject in the previous image). In some embodiments, the processing device 112 may determine a distance between the equivalent first position information of the first subject and the second position information of each second subject and determine whether the first subject and the second subject belong to the same object based on the distance between the equivalent first position information and the second position information. For example, the processing device 112 may determine the distance between the center point of the first subject in the equivalent first position information and the center point of the second subject in the second position information. The processing device 112 may determine that the first subject and the second subject belong to the same object if the distance between the center point of the first subject in the equivalent first position information and the center point of the second subject in the second position information is less than a distance threshold. In some embodiments, the processing device 112 may determine whether the center point of the first subject in the equivalent first position information is within a region defined by the boundary of the second subject in the second position information and/or the center point of the second subject is within a region defined by the boundary of the first subject in the equivalent first position information. The processing device 112 may determine that the first subject and the second subject belong to the same object if the center point of the first subject in the equivalent first position information is within the region defined by the boundary of the second subject and/or the center point of the second subject in the second position information is within the region defined by the boundary of the first subject in the equivalent first position information. In some embodiments, the processing device 112 may determine the equivalent first position information of the first subject based on the first position information of the first subject in the current image. For example, the processing device 112 may convert the first position information of the first subject into the equivalent first position information using a third transforming relationship (e.g., a transforming matrix) between a first coordinate system applied to the first imaging component at the current time and a second coordinate system applied to the first imaging component at the previous time. The third transforming relationship (e.g., a transforming matrix) may be associated with position parameters (e.g., an angle of the first imaging component rotating from the previous time to the current time) of the first imaging component at the current time and the position parameters of the first imaging component at the previous time. The third transforming relationship (e.g., a transforming matrix) may be a default setting of the system 100. The determination of the third transforming relationship may be the same as or similar to the first transforming relationship or the second transforming relationship.

In some embodiments, the processing device 112 may determine equivalent second position information of the second subject based on the second position information of the second subject in the previous image, and determine whether the first subject and the second subject belong to the same object based on the equivalent second position information and the first position information. The equivalent second position information may include position information of the second subject in the previous image if the second imaging component acquires the previous image with the position parameters the same as the position parameters for acquiring the current image (also referred to as position information of the second subject in the current image). In some embodiments, the processing device 112 may determine a distance between the equivalent second position information of the second subject and the first position information of the first subject, and determine whether the first subject and the second subject belong to the same object based on the distance between the equivalent second position information of the second subject and the first position information of the first subject. For example, the processing device 112 may determine a distance between the center point of the second subject in the equivalent second position information and the center point of the first subject in the first position information. The processing device 112 may determine that the first subject and the second subject belong to the same object if the distance between the center point of the second subject in the equivalent second position information and the center point of the first subject in the first position information exceeds a distance threshold. In some embodiments, the processing device 112 may determine whether the center point of the second subject in the equivalent second position information is within a region defined by the boundary of the first subject in the first position information and/or the center point of the first subject is within a region defined by the boundary of the second subject in the equivalent second position information. The processing device 112 may determine that the first subject and the second subject belong to the same object if the center point of the second subject in the equivalent second position information is within a region defined by the boundary of the first subject and/or the center point of the first subject in the first position information is within the region defined by the boundary of the second subject in the equivalent second position information. In some embodiments, the processing device 112 may determine the equivalent second position information of the second subject based on the second position information of the second subject in the previous image. For example, the processing device 112 may convert the second position information of the second subject into the equivalent second position information using a fourth transforming relationship (e.g., a transforming matrix) between the first coordinate system applied to the first imaging component at the current time and the second coordinate system applied to the first imaging component at the previous time. The fourth transforming relationship (e.g., a transforming matrix) may be associated with position parameters (e.g., an angle of the first imaging component rotating from the previous time to the current time) of the first imaging component at the current time and the position parameters of the first imaging component at the previous time. The fourth transforming relationship (e.g., a transforming matrix) may be a default setting of the system 100. In some embodiments, the third transforming relationship and the fourth relationship may include a first transforming matrix and a second transforming matrix, and the first transforming matrix and the second transforming matrix may be reciprocal matrixes. The determination of the fourth transforming relationship may be the same as or similar to the first transforming relationship or the second transforming relationship.

In some embodiments, the processing device 112 may determine a first target region in the current image. The processing device 112 may obtain or determine one or more second target regions (also referred to as blind zones or target regions) in the previous image. In some embodiments, the first target region may indicate the first subject and the one or more second target regions may indicate the one or more second subjects. In some embodiments, the first target region in the current image may enclose the boundary of the first subject represented in the current image. A second target region in the previous image may enclose the boundary of the second subject represented in the previous image. In some embodiments, a target region in the current image and/or the previous image may be denoted using a bounding box. In some embodiments, the target region may be enclosed by a bounding box, that is, the bounding box may represent the target region. The target region may be identified using the bounding box. The bounding box may be 2-dimensional or 3-dimensional. For example, if the current image and/or the previous image is a 2-dimensional image, the bounding box may have the shape of a square, a rectangle, a triangle, a polygon, a circle, an ellipse, an irregular shape, or the like. As another example, if the current image and/or the previous image is a 3-dimensional image, the bounding box may have the shape of a cube.

In some embodiments, the target region may be identified from the current image and/or the previous image manually by a user (e.g., an operator, a guard, etc.) by, for example, drawing the bounding box on the current image and/or the previous image displayed on a user interface. Alternatively, the target region may be identified by the processing device 120 automatically according to an image analysis algorithm (e.g., an image segmentation algorithm). For example, the processing device 120 may perform image segmentation on the image using an image segmentation algorithm to generate the target region. Exemplary image segmentation algorithms may include a threshold-based segmentation algorithm, a compression-based algorithm, an edge detection algorithm, a machine learning-based segmentation algorithm, or the like, or any combination thereof.

In some embodiments, the bounding box may be defined by at least one of one or more geometric parameters and/or position parameters. Exemplary geometric parameters may include a shape, a size, of the bounding box, etc. Exemplary position parameters may include coordinates of the center point of the bounding box, coordinates of edge points, coordinates of vertexes of the bounding box, etc. For example, if the bounding box is a rectangle box, the geometric parameters of the bounding box may include a length and a width of the rectangle box, and the position parameters of the bounding box may include coordinates of the center point and coordinates of vertexes of the rectangle box. As another example, if the bounding box is circular, the geometric parameters of the bounding box may include a radius of the circular box, and the position parameters of the bounding box may include coordinates of the center point of the circular box.

The processing device 120 may determine the geometric parameter(s) and position parameter(s) based on the current image and/or the previous image, and then identify the target region from the current image and/or the previous image based on at least one of the geometric parameter(s) and position parameter(s). The processing device 120 may represent the target region using the bounding box with the geometric parameter(s) and position parameter(s). In some embodiments, the geometric parameter(s) and position parameter(s) may be determined automatically by the processing device 120 and/or manually by a user through a terminal device. For example, the geometric parameter(s) and position parameter(s) may be determined inputting by a user on a user interface.

Figure 7:
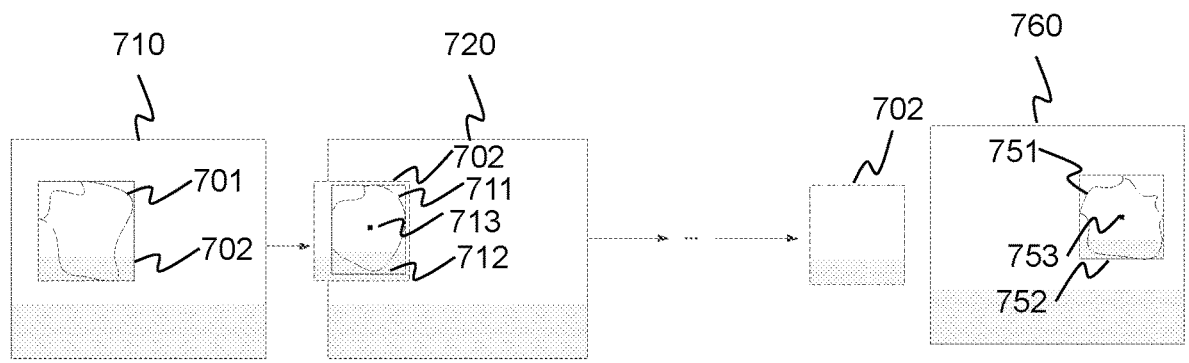
FIG. 7 is a schematic diagram illustrating exemplary an exemplary process for determining whether a first subject and a second subject among one or more second subjects belong to a same object according to some embodiments of the present disclosure.

Referring to FIG. 7, when image 710 is obtained, image 710 may be the current image. A first target region 702 may include a first subject 701 in the current image 710. When image 720 is obtained, image 720 may be the current image. A first target region 712 may include a first subject 711 in the current image 720. When an image 760 is obtained, image 760 may be the current image. A first target region 752 may include a first subject 751 in the current image 760. It should be noted that a shape of the first target region 702 is merely provided for the purposes of illustration, and not intended to limit the scope of the present disclosure. The shape of the first target region 702 may include a circle, an ellipse, a triangle, a pentagon, or any other suitable shape. In some embodiments, the first target region may be determined using the imaging recognition algorithm. For example, the first target region including the first subject may be determined using the smoke detection algorithm based on color segmentation in a smoke detection scenario.

The one or more second target regions may include the one or more second subjects. In some embodiments, the one or more second target regions may be determined using the imaging recognition algorithm. For example, the one or more second target regions including the one or more second subjects may be determined using the smoke detection algorithm based on color segmentation in the smoke detection scenario. In some embodiments, the second target region in the previous image may enclose the boundary of the second subject represented in the previous image. A second target region in the previous image may enclose the boundary of the second subject represented in the previous image. In some embodiments, a target region in the current image and/or the previous image may be denoted using a bounding box. Referring to FIG. 7, when an image 720 is obtained, image 720 may be a current image and image 710 may be a previous image. The first target region 712 may include a first subject 711 in the current image 720. The second target region 702 may include a second subject 701 in the previous image 710. The second target region 702 in the current image 720 may be an equivalent second target region 702.

The first position information of the first subject may be denoted by the position information of the first target region in the first image. The second position information of the second subject may be denoted by second position information of the second target regions in the previous image. In some embodiments, the processing device 112 may determine whether the first subject and the second subject belong to the same object based on the first target region and/or the one or more second target regions. More descriptions regarding the determination of whether the first subject and the second subject belong to the same object may be found elsewhere in the present disclosure, for example, FIGS. 6A and 6B and relevant descriptions thereof.

In some embodiments, if the first subject and the second subject belong to the same object, the processing device 112 may perform operation 508. If the first subject and the second subject belong to different objects, the processing device 112 may perform operation 510.

In 506, the processing device 112 (e.g., the control module 430) may cause a moveable component to move the first imaging component in response to determining that the first subject and the one of the one or more second subjects belong to the same object.

The moveable component may be configured to move at least a portion of the object detection device (e.g., the first imaging component 161, the second imaging component 162, etc.). More descriptions regarding the moveable component may be found elsewhere in the present disclosure, for example, FIG. 1B and relevant descriptions thereof.

In some embodiments, in response to determining that the first subject and the second subject belong to the same object, the processing device 112 may cause the moveable component (e.g., the moveable component 163) to move the first imaging component (e.g., the first imaging component 161). For example, the processing device 112 may cause the moveable component to move the first imaging component to a next position according to the detection route. As another example, the processing device 112 may cause the moveable component to rotate the first imaging component at an angle according to an actual detection environment. For example, if the smoke detection is a fixed-point smoke detection, the processing device 112 may cause the moveable component to move to a next preset point. As another example, if the smoke detection is a mobile smoke detection, the processing device 112 may cause the moveable component to rotate.

In some embodiments, in response to determining that the first subject and the second subject belong to the same object, the processing device 112 may update the one or more second subjects based on the first subject. For example, the processing device 112 may update the previous image of the second subject using the current image of the first subject. As another example, the processing device 112 may update the one or more second target regions using the first target region. As a further example, the processing device 112 may update second position information of the second subject using the first position information of the first subject. The updating the one or more second subjects may include replacing information (e.g., the previous image, the one or more second target regions, the second position information) of the second subject corresponding to the first subject by information (e.g., the previous image, the one or more second target regions, the second position information) of the first subject.

In 508, the processing device 112 (e.g., the control module 430) may stop the moveable component to move the first imaging component in response to determining that the first subject and the second subject belong to different subjects.

In some embodiments, the processing device 112 may determine whether the first subject is smoke of combustion and/or determine a location of the combustion. In some embodiments, the processing device 112 may obtain an image of the first subject (also referred to as a second image) acquired by a second imaging component of the object detection device. The second image may include temperature information of the first subject. For example, the second image may include a thermal image. A temperature of each portion in the thermal image may be indicated by a color. The temperature information of the first subject may be obtained through a corresponding relationship between the color and the temperature. The second imaging component may be configured to acquire the second image of the first subject. More descriptions regarding the second imaging component may be found elsewhere in the present disclosure, for example, FIG. 1B and relevant descriptions thereof. The processing device 112 may determine, based on the second image, whether the first subject is the smoke of the combustion. For example, if a temperature of the first subject represented in the second image is larger than a temperature of combustion, the processing device 112 may determine that the first subject is the smoke of the combustion; if a temperature of the first subject represented in the second image is smaller than a temperature of combustion, the processing device 112 may determine that the first subject is not the smoke of the combustion. As another example, if there is a color of the first subject that indicates a temperature is larger than a temperature of combustion, the processing device 112 may determine that the first subject is the smoke of the combustion; if there is no color of the first subject that indicates a temperature is larger than a temperature of combustion, the processing device 112 may determine that the first subject is the smoke of the combustion.

In response to determining that the first subject is smoke of the combustion, the processing device 112 may report the first position information of the first subject and/or the current position. For example, the processing device 112 may transmit the first position information of the first subject and/or the current position to the user device 140 via the network 120. The first position information of the first subject may indicate first position information (e.g., coordinates) of a reference point (e.g., a center point or one or more points on the boundary of the first subject) representing the first subject. More descriptions regarding the first position information of the reference point may be found elsewhere in the present disclosure, for example, operation 602 in FIG. 6A and relevant descriptions thereof.

In some embodiments, after determining that the first subject is smoke of the combustion, the processing device 112 may further cause the first imaging component to acquire a replacement image of the first subject for replacing the current image centered on the reference point, such that the reference point of the first subject is located at the center of the replacement image of the first subject. For example, if the resolution of the current image is 8192×8192, coordinates of the center of the current image may be determined according to the resolution as (4096, 4096). If coordinates of the reference point are (3098,4001), the processing device 112 may cause the moveable component to move the first imaging component with a first distance of 1001 along a horizontal direction and a second distance of 95 along a vertical direction. Accordingly, the processing device 112 may cause the first imaging component to acquire the replacement image centered on the reference point, which may be convenient for a user to process the replacement image.

In some embodiments, the processing device 112 may cause the moveable component (e.g., the moveable component 163) to move the first imaging component (e.g., the first imaging component 161) after the second image of the first subject is acquired by the second imaging component. For example, the processing device 112 may cause the moveable component to move the first imaging component to a next position according to the detection route if the smoke detection is a fixed-point smoke detection. As another example, the processing device 112 may cause the moveable component to rotate the first imaging component at an angle according to an actual detection environment if the smoke detection is a mobile smoke detection.

In some embodiments, in response to determining that the first subject and the second subject belong to different objects, the processing device 112 may designate the first subject as a second subject, and/or designate the first position information as the second position information, and/or designate the first target region as a second target region. In some embodiments, the processing device 112 may store the current image of the first subject (or the current image with the marked first subject) in a storage device (e.g., the storage device 150, the ROM 224, the RAM 221, and/or the storage 390) via a network (e.g., the network 120). The stored current image may serve as a previous image of the first subject when the processing device 112 obtains a next current image of a next subject acquired by the first imaging component at a next time. In some embodiments, the processing device 112 may store the first position information of the first subject in the current image in the storage device. The stored first position information of the first subject may serve as second position information when the processing device 112 perform next smoke detection. In some embodiments, the processing device 112 may store information of the first target region of the first subject and the stored information of the first target region of the first subject may serve as a second target region (i.e., a blind zone) when the processing device 112 perform next smoke detection.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, an operation of obtaining the first image may be added before operation 502 in the process 500. As another example, one or more other optional operations (e.g., a storing operation, a transmitting operation) may be added elsewhere in the process 500. In the storing operation, the processing device 112 may store information and/or data (e.g., the current image, the previous image, the second image, the first target region, the one or more second target regions, etc.) in a storage device (e.g., the storage device 150, the storage 202, the storage 390) disclosed elsewhere in the present disclosure. In the transmitting operation, the processing device 112 may transmit the stored information and/or data to the user device 140. As a further example, operation 502 and operation 504 may be combined into a single operation in which the processing device 112 may obtain the current image and the previous image.

Figure 6A:
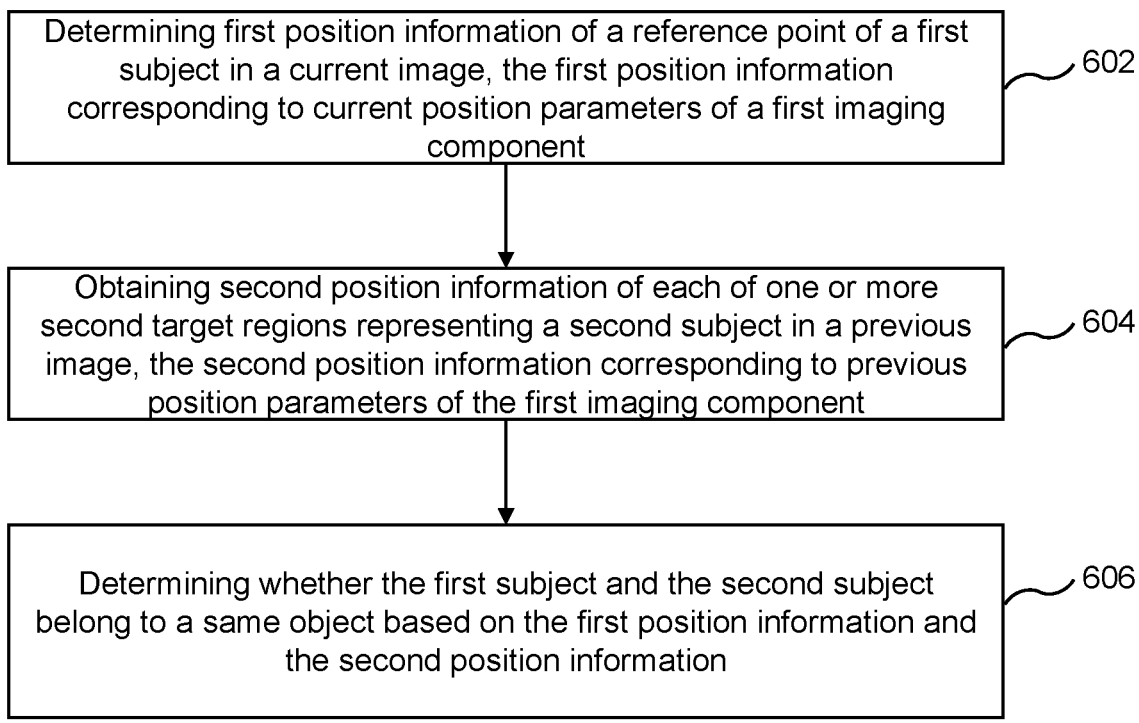
FIG. 6A is a schematic diagram illustrating an exemplary process for determining whether a first subject and a second subject among one or more second subjects belong to a same object according to some embodiments of the present disclosure.

FIG. 6A is a flowchart illustrating an exemplary process for determining whether the first subject and a second subject among one or more second subjects belong to the same object according to some embodiments of the present disclosure. In some embodiments, process 600 may be executed by the detection system 100. For example, the process 600 may be implemented as a set of instructions (e.g., an application) stored in a storage device (e.g., the storage device 150, the ROM 223, the RAM 221, and/or the storage 390). In some embodiments, the processing device 112 (e.g., the processor 201 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6A and described below is not intended to be limiting. In some embodiments, one or more operations of process 600 may be performed to achieve at least part of operation 506 as described in connection with FIG. 5.

In 602, the processing device 112 (e.g., the determination module 420) may determine first position information of a reference point of a first subject represented in a current image. The first position information may correspond to current position parameters of a first imaging component acquiring the current image.

The reference point refers to a point of the first subject. In some embodiments, the reference point may represent the first subject in the current image. In some embodiments, the reference point may include a center point of the first subject or a point around the center point of the first subject. Referring to FIG. 7, point 713 is a reference point represented the first subject in the current image. In some embodiments, the processing device 112 may determine the first position information of the reference point based on the current image. For example, the current image may be set in a first coordinate system and the reference point may be the center point of a region defined by the boundary of the first subject. The processing device 112 may determine the first position information of the reference point according to the first coordinate system. The first position information of the reference point may include coordinates of the center point of the first subject.

In some embodiments, the reference point may be a center point of a first target region in the current image. The first target region may enclose the first subject. The processing device 112 may determine the first position information of the reference point according to the first target region. For instance, the current image may be set in the first coordinate system and a shape of the first target region may be a rectangle. The processing device 112 may determine coordinates of four vertexes of the first target region. Accordingly, the processing device 112 may determine coordinates of the reference point based on the coordinates of four vertexes of the first target region. That is, if the coordinates of four vertexes of the first target region are (a, b), (c, d), (e, f), and (m, n), the coordinates of the reference point may be determined according to Equation (1) and Equation (2).

$$x=(a+c+e+m)/4; \qquad (1)$$

$$y=(b+d+f+n)/4, \qquad (2)$$

where, x refers to a horizontal coordinate of the reference point in the first coordinate system, and y refers to a vertical coordinate of the reference point in the first coordinate system.

In some embodiments, the current position parameters of the first imaging component may include a current position of an optical center of the first imaging component (i.e., the current position of the first imaging component), a current direction of the optical axis, etc., at a current time for acquiring the current image. In some embodiments, the current position of an optical center of the first imaging component at the current time may be related to a current position of the moveable component of the object detection device. The current direction of the optical axis at the current time may be related to a rotation angle of the moveable component of the object detection device.

In 604, the processing device 112 (e.g., the obtaining module 410 or the determination module 420) may determine or obtain second position information of each of one or more second target regions representing a second subject in a previous image. The second position information may correspond to previous position parameters of the first imaging component acquiring the previous image.

In some embodiments, the second position information may be determined when the previous image is used for object detection and stored in a storage device. The processing device 112 may obtain the second position information from the storage device.

In some embodiments, the second position information may be configured to position the each of the one or more second target regions (also referred to as target regions). The second target region may enclose the second subject. The second position information may include position information regarding one or more feature points, position information regarding one or more feature sides, or the like, or any combination thereof, of the each of the one or more second target regions. In some embodiments, the processing device 112 may obtain the previous image from a storage device (e.g., the storage device 150, the ROM 223, the RAM 221, and/or the storage 390) via a network (e.g., the network 120). For example, the previous image may be previously stored in the storage device. The processing device 112 may obtain the previous image from the storage device via the network. The processing device 112 may determine the second position information of each of the one or more second subjects based on the previous image. For example, the previous image may be set in a second coordinate system. In some embodiments, the processing device 112 may determine the second position information of each of the one or more target second regions represented one second subject in the previous image according to the second coordinate system. For example, if a shape of a second target region is a rectangle, the processing device 112 may determine coordinates of four vertexes of the second target region in the second coordinate system. As another example, if a shape of a second target region is a circle, the processing device 112 may determine coordinates of a center of the circle and a length of a radius of the circle in the second coordinate system. In some embodiments, the processing device 112 may obtain the second position information of each of the one or more second subjects from a storage device (e.g., the storage device 150, the ROM 223, the RAM 221, and/or the storage 390) via a network (e.g., the network 120). For example, the second position information of each of the one or more second subjects may be previously stored in the storage device (e.g., a database) after the one or more second subjects are detected from the previous image. The processing device 112 may obtain the second position information from the storage device via the network.

In some embodiments, the previous position parameters of the first imaging component may include a position of an optical center of the first imaging component (i.e., the previous position of the first imaging component), a direction of the optical axis, etc., at a previous time for acquiring the previous image. In some embodiments, the position of the optical center of the first imaging component at the previous time may be related to a previous position of the moveable component of the object detection device at the previous time. The previous direction of the optical axis may be related to a rotation angle of the moveable component of the object detection device at the previous time.

In 606, the processing device 112 (e.g., the determination module 420) may determine whether the first subject and a second subject among the one or more second subjects belong to the same object based on the first position information and the second position information.

In some embodiments, the processing device 112 may determine equivalent first position information of the reference point and determine whether the first subject and the second subject among the one or more second subjects belong to the same object based on the equivalent first position information and the second position information. The equivalent first position information may include position information of the reference point if the current image is acquired by the first imaging component with the previous position parameters. In some embodiments, the processing device 112 may determine a difference between the current position parameters and the previous position parameters. The difference may include a horizontal difference between the current position and the previous position, a vertical difference between the current position and the previous position, and/or a rotation angle of the optical axis of the first imaging component from the previous time to the current time. The horizontal difference between the current position and the previous position may be a horizontal distance between the optical centers of the first imaging component at the previous time and the current time, i.e., a horizontal distance of the first imaging component moving from the previous time to the current time, that is equal to a horizontal distance of the moveable component moving from the previous time to the current time. The vertical difference between the current position and the previous position may be a vertical distance between the optical centers of the first imaging component at the previous time and the current time, i.e., a vertical distance of the first imaging component moving from the previous time to the current time, that is equal to a vertical distance of the moveable component moving from the previous time to the current time. The rotation angle of the optical axis of the first imaging component from the previous time to the current time may be equal to the rotation angle of the moveable component rotating from the previous time to the current time. The processing device 112 may determine the equivalent first position information of the reference point based on the difference between the current position parameters and the previous position parameters. For example, the processing device 112 may determine the equivalent first position information of the reference point (or a feature point of the first subject or the first target region, e.g., vertex points, a center point, or a point in the first target region, or a point on the boundary of the first target region) according to Equation (3) and Equation (4).

$$x' = x + (p_x - p_{x'})/\text{fov} \times \text{Hori};\quad(3)$$

$$y' = y + (p_y - p_{y'})/\text{fov} \times \text{Ver},\quad(4)$$

where x' refers to an equivalent horizontal coordinate of the reference point if the current image is acquired by the first imaging component with the previous position parameters; x refers to the horizontal coordinate of the reference point in the first coordinate system; $p_x$ refers to a horizontal coordinate of the first imaging component at the current time that is an angle of a rotation of the first imaging component in a horizontal direction; $p_{x'}$ refers to a horizontal coordinate of the first imaging component at the previous time; $(p_x - p_{x'})$ refers to the horizontal difference between the current position parameters and the previous position parameters; fov refers to a field view of the first imaging component and may be determined according to parameters (e.g., a pixel, a count of focus points, an effective focal length, the lens magnification of the first imaging component, etc.) of the first imaging component and/or a manual setting; Hori refers to a count of pixels along a horizontal direction in an image acquired by the first imaging component; y' refers to an equivalent vertical coordinate of the reference point if the current image is acquired by the first imaging component with the previous position parameters; y refers to the vertical coordinate of the reference point in the first coordinate system; $p_y$ refers to a vertical coordinate of the first imaging component (e.g., the optical center) at the current time that is an angle between the first imaging component and the horizontal direction; $p_{y'}$ refers to a vertical coordinate of the first imaging component at the previous time; $(p_y - p_{y'})$ refers to the vertical difference between the current position parameters and the previous position parameters; Ver refers to a count of pixels along a vertical direction in the image acquired by the first imaging component.

In some embodiments, the processing device 112 may determine whether the first subject and the second subject belong to the same object by determining whether the reference point is within one of the one or more second target regions based on the equivalent first position information and the second position information. For example, the processing device 112 may determine whether the reference point is within one of the one or more second target regions based on the equivalent horizontal coordinate (x') of the reference point, the equivalent vertical coordinate (y') of the reference point, and coordinates of four vertexes of each of the one or more second target regions. If the reference point is within one of the one or more second target regions, the processing device 112 may determine that the first subject and the second subject belong to the same object. If the reference point is not within one of the one or more second target regions, the processing device 112 may determine that the first subject and the second subject belong to different subjects.

In some embodiments, the processing device 112 may determine equivalent second position information of the one or more second target regions. The equivalent second position information may include position information of the one or more second target regions if the previous image is acquired by the first imaging component with the current position parameters. In some embodiments, the processing device 112 may determine the difference between the current position parameters and the previous position parameters. The difference may include the horizontal difference between the current position and the previous position, the vertical difference between the current position and the previous position, and/or a rotation angle of the optical axis of the first imaging component from the previous time to the current time. The horizontal difference between the current position and the previous position may be a horizontal distance between the optical centers of the first imaging component at the previous time and the current time, i.e., a horizontal distance of the first imaging component moving from the previous time to the current time, that is equal to a horizontal distance of the moveable component moving from the previous time to the current time. The vertical difference between the current position and the previous position may be a vertical distance between the optical centers of the first imaging component at the previous time and the current time, i.e., a vertical distance of the first imaging component moving from the previous time to the current time, that is equal to a vertical distance of the moveable component moving from the previous time to the current time. The rotation angle of the optical axis of the first imaging component from the previous time to the current time may be equal to the rotation angle of the moveable component rotating from the previous time to the current time. The processing device 112 may determine the equivalent second position information of the one or more second target regions based on the difference between the current position parameters and the previous position parameters. For example, the processing device 112 may determine equivalent coordinates of four vertexes of one of the one or more second target regions in the first coordinate system if the previous image is acquired at the current time based on the difference between the current position parameters and the previous position parameters. As another example, the processing device 112 may determine equivalent coordinates of the center of the circle and an equivalent length of the radius of the circle in the first coordinate system if the previous image is acquired at the current time based on the difference between the current position parameters and the previous position parameters. Merely by way of example, the processing device 112 may determine equivalent second position information of a feature point (e.g., vertex points, a center point, or a point in the second target region, or a point on the boundary of the second target region) of the one or more second target regions according to Equation (5) and Equation (6).

$$m'=x+(p_{m'}-p_m)/\text{fov}\times\text{Hori}; \quad (5)$$

$$n'=n+(p_{n'}-p_n)/\text{fov}\times\text{Ver}, \quad (6)$$

where m' refers to an equivalent horizontal coordinate of the feature point if the previous image is acquired by the first imaging component with the current position parameters; m refers to the horizontal coordinate of the feature point in the second coordinate system; $p_m$ refers to a horizontal coordinate of the first imaging component at the previous time that is an angle of a rotation of the first imaging component in a horizontal direction; $p_{m'}$ refers to a horizontal coordinate of the first imaging component at the current time; $(p_m-p_{m'})$ refers to the horizontal difference between the current position parameters and the previous position parameters; n' refers to an equivalent vertical coordinate of the feature point if the previous image is acquired by the first imaging component with the current position parameters; n refers to the vertical coordinate of the feature point in the second coordinate system; $p_n$ refers to a vertical coordinate of the first imaging component (e.g., the optical center) at the previous time that is an angle between the first imaging component and the horizontal direction; $p_{n'}$ refers to a vertical coordinate of the first imaging component at the current time; $(p_y-p_{y'})$ refers to the vertical difference between the current position parameters and the previous position parameters.

In some embodiments, the processing device 112 may determine whether the first subject and the second subject belong to the same object by determining whether the reference point is within one of the one or more second target regions based on the equivalent second position information and the first position information. For example, the processing device 112 may determine whether the reference point is within one of the one or more second target regions based on the horizontal coordinate (x) of the reference point, the vertical coordinate (y) of the reference point, and each set of equivalent coordinates of four vertexes of the one or more second target regions. If the reference point is within one of the one or more second target regions, the processing device 112 may determine that the first subject and the second subject belong to the same object. If the reference point is not within one of the one or more second target regions, the processing device 112 may determine that the first subject and the second subject belong to different subjects.

In some embodiments, the processing device 112 may determine equivalent first position information in a reference coordinate system by converting the first position information under the first coordinate system to the reference coordinate system. For example, the processing device 112 may determine the equivalent first position information under the world coordinate system using a SLAM technique. As another example, the processing device 112 may determine the equivalent first position information under the reference coordinate system according a transforming relationship (e.g., the first transforming relationship as described in FIG. 5) between the first coordinate system and the reference coordinate system. In some embodiments, the processing device 112 may determine equivalent second position information in the reference coordinate system by converting the second position information under the second coordinate system to the reference coordinate system. For example, the processing device 112 may determine the equivalent second position information under the world coordinate system using the SLAM technique. As another example, the processing device 112 may determine the equivalent second position information under the reference coordinate system according to a transforming relationship (e.g., the second transforming relationship as described in FIG. 5) between the second coordinate system and the reference coordinate system. In some embodiments, the processing device 112 may determine whether the first subject and the second subject belong to the same object by determining whether the reference point is within one of the one or more second target regions based on the equivalent first position information and the equivalent second position information. For example, the processing device 112 may determine whether the reference point is within one of the one or more second target regions based on the equivalent first position information and the equivalent second position information under the reference coordinate system. If the reference point is within one of the one or more second target regions, the processing device 112 may determine that the first subject and the second subject belong to the same object. If the reference point is not within one of the one or more second target regions, the processing device 112 may determine that the first subject and the second subject belong to different subjects.

Since the coordinates of the reference point and the coordinates of the one or more second target regions are converted into the same coordinate system, the determination of whether the first subject and the second subject belong to different subjects may be more accurate. With respect to using the first position information of the first subject and the second position information of the second subject to determine whether the first subject and the second subject belong to the same object, the introduction of the reference point and the second target regions may reduce data amount to be calculated, thereby saving computing resources (e.g., occupied memory) and improving computing speed, thereby improving the efficiency and accuracy of the determination.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation, a transmitting operation) may be added elsewhere in the process 600. In the storing operation, the processing device 112 may store information and/or data (e.g., the first position information, the second position information, the equivalent first position information, the equivalent second position information, etc.) in a storage device (e.g., the storage device 150, the storage 202, the storage 390) disclosed elsewhere in the present disclosure. In the transmitting operation, the processing device 112 may transmit the stored information and/or data to the user device 140.

In some embodiments, the processing device 112 may determine first position information of the first target region representing the first subject in a current image and determine whether the first subject and the second subject among the one or more second subjects belong to the same object based on the first position information and the second position information. For example, the processing device 112 may determine whether the first subject and the second subject among the one or more second subjects belong to the same object based on a ratio of an overlapping area between the first target region and a second target region and an area of the second target region. For instance, if the ratio is larger than a ratio threshold, the processing device 112 may determine that the first subject and the second subject among the one or more second subjects belong to the same object. If the ratio is less than or equal to the ratio threshold, the processing device 112 may determine that the first subject and the second subject among the one or more second subjects belong to different subjects. The ratio threshold may be determined according to a manual setting and/or default setting. For example, the ratio threshold may be 10%, 20%, 30%, 40%, 50%, 60%, 70%, etc.

Figure 6B:
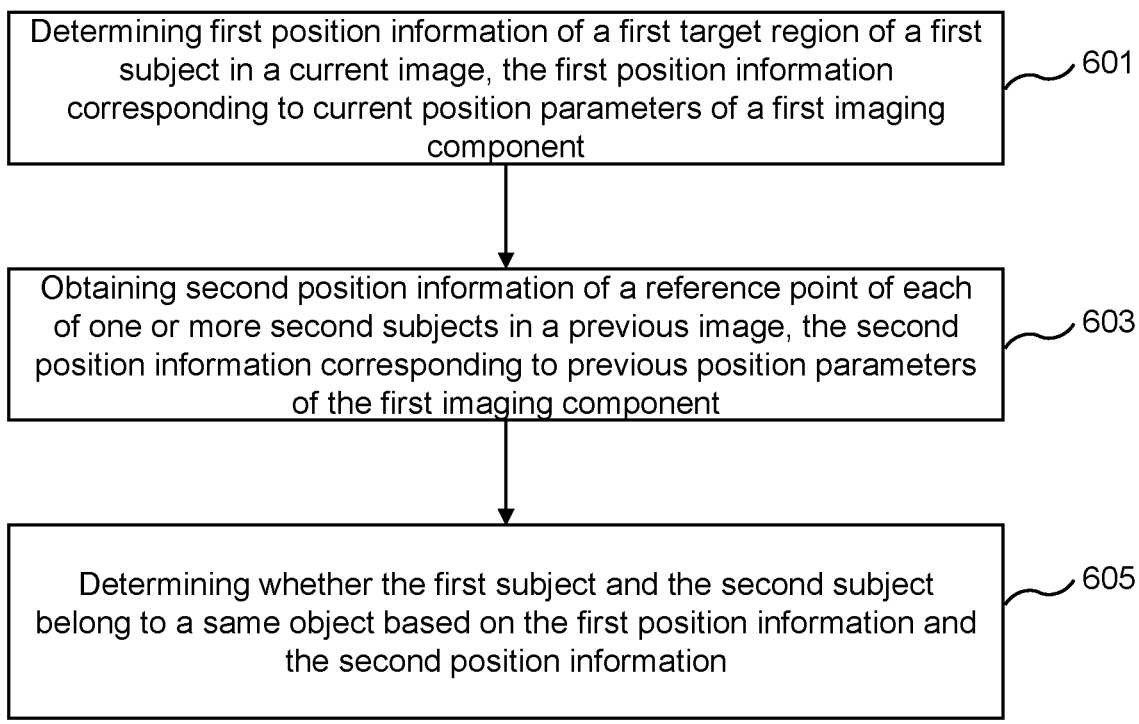
FIG. 6B is a schematic diagram illustrating an exemplary process for determining whether a first subject and a second subject among one or more second subjects belong to a same object according to some embodiments of the present disclosure.

FIG. 6B is a flowchart illustrating an exemplary process for determining whether the first subject and a second subject among one or more second subjects belong to the same object according to some embodiments of the present disclosure. In some embodiments, process 650 may be executed by the detection system 100. For example, the process 650 may be implemented as a set of instructions (e.g., an application) stored in a storage device (e.g., the storage device 150, the ROM 223, the RAM 221, and/or the storage 390). In some embodiments, the processing device 112 (e.g., the processor 201 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 650 may be accomplished with one or more additional operations not described and/or without one or more of the operations discussed. Additionally, the order of the operations of process 650 illustrated in FIG. 6B and described below is not intended to be limiting. In some embodiments, one or more operations of process 650 may be performed to achieve at least part of operation 506 as described in connection with FIG. 5.

In 602, the processing device 112 (e.g., the determination module 420) may determine first position information of a first target region of a first subject represented in a current image. The first position information may correspond to current position parameters of a first imaging component acquiring the current image. The first position information of the first target region of the first subject represented in the current image may be described elsewhere in the present disclosure (e.g., FIGS. 5 and 6A, and the descriptions thereof).

In 603, the processing device 112 (e.g., the obtaining module 410 or the determination module 420) may determine or obtain second position information of a reference point of each of one or more second subjects in a previous image. The second position information may correspond to previous position parameters of the first imaging component acquiring the previous image. The second position information of the reference point of the second subject represented in the current image may be described elsewhere in the present disclosure (e.g., FIGS. 5 and 6A, and the descriptions thereof).

In 605, the processing device 112 (e.g., the determination module 420) may determine whether the first subject and a second subject among the one or more second subjects belong to the same object based on the first position information and the second position information.

In some embodiments, the processing device 112 may determine equivalent first position information of the first target region and determine whether the first subject and the second subject among the one or more second subjects belong to the same object based on the equivalent first position information and the second position information. For example, the processing device 112 may determine the equivalent first position information of the vertex points of the first target region according to Equations (3) and (4). The processing device 112 may determine whether the first subject and the second subject among the one or more second subjects belong to the same object equivalent first position information of the first target region by determining whether the reference point is within the target first region based on the equivalent first position information and the second position information.

In some embodiments, the processing device 112 may determine equivalent second position information of the reference point and determine whether the first subject and the second subject among the one or more second subjects belong to the same object based on the first position information and the equivalent second position information. For example, the processing device 112 may determine the equivalent second position information of the reference point of the second subject according to Equations (5) and (6). The processing device 112 may determine whether the first subject and the second subject among the one or more second subjects belong to the same object equivalent first position information of the first target region by determining whether the reference point is within the target first region based on the equivalent second position information and the first position information.

The determination of whether the first subject and the second subject among the one or more second subjects belong to the same object may be the same as or similar to the determination of whether the first subject and the second subject among the one or more second subjects belong to the same object as described in FIG. 6A.

FIG. 7 is a schematic diagram illustrating an exemplary process for determining whether a first subject and a second subject among one or more second subjects belong to a same object according to some embodiments of the present disclosure.

As shown in FIG. 7, a first imaging component of an object detection device acquired an image 710 of a subject 701 (e.g., the previous image of the second subject as described in FIGS. 5 and 6). A target region 702 including subject 701 is determined. After determining that image 710 includes subject 701, subject 701, the position information of subject 701 in image 710, and/or the position information of the target region 702 in image 710 may be stored in a storage device. Then, the first imaging component acquires an image 720 (e.g., the current image as described in FIGS. 5 and 6) of a subject 711. A target region 712 including subject 711 is determined. A reference point 713 (e.g., a center point of the subject 711) is determined according to the target region 712. The equivalent position information of the target region 702 is determined based on the position information of the target region 702 in image 710. As shown in image 720, the equivalent position information of the target region 702 is denoted by a dotted bounding box in image 720. By comparing the equivalent position information of the target region 702 and position information of the reference point 713, the processing device 112 determines that the reference point 713 is within the target region 702, and the processing device 112 determines that subject 711 and the subject 701 belong to the same object. The processing device 112 causes a moveable component of the object detection device to move the first imaging component, and the first imaging component acquires the next image at the next time.

The first imaging component acquires an image 760 of a subject 751 (e.g., the current image of the first subject as described in FIGS. 5 and 6). A target region 752 including subject 751 is determined. A reference point 753 (e.g., a center point of the subject 751) is determined according to the target region 752. The equivalent position information of the target region 702 is determined based on the position information of the target region 702 in image 710. As shown in image 750, the equivalent position information of the target region 702 is denoted by a dotted bounding box in image 750. By comparing the equivalent position information of the target region 702 and position information of the reference point 753, the processing device 112 determines that the reference point 713 is not within the target region 702, and the processing device 112 determines that subject 751 and the subject 701 belong to different objects. Accordingly, subject 751 is added into one or more second subjects. The processing device 112 causes a moveable component of the object detection device to move the first imaging component, and the first imaging component acquires the next image at the next time.

Figure 9:
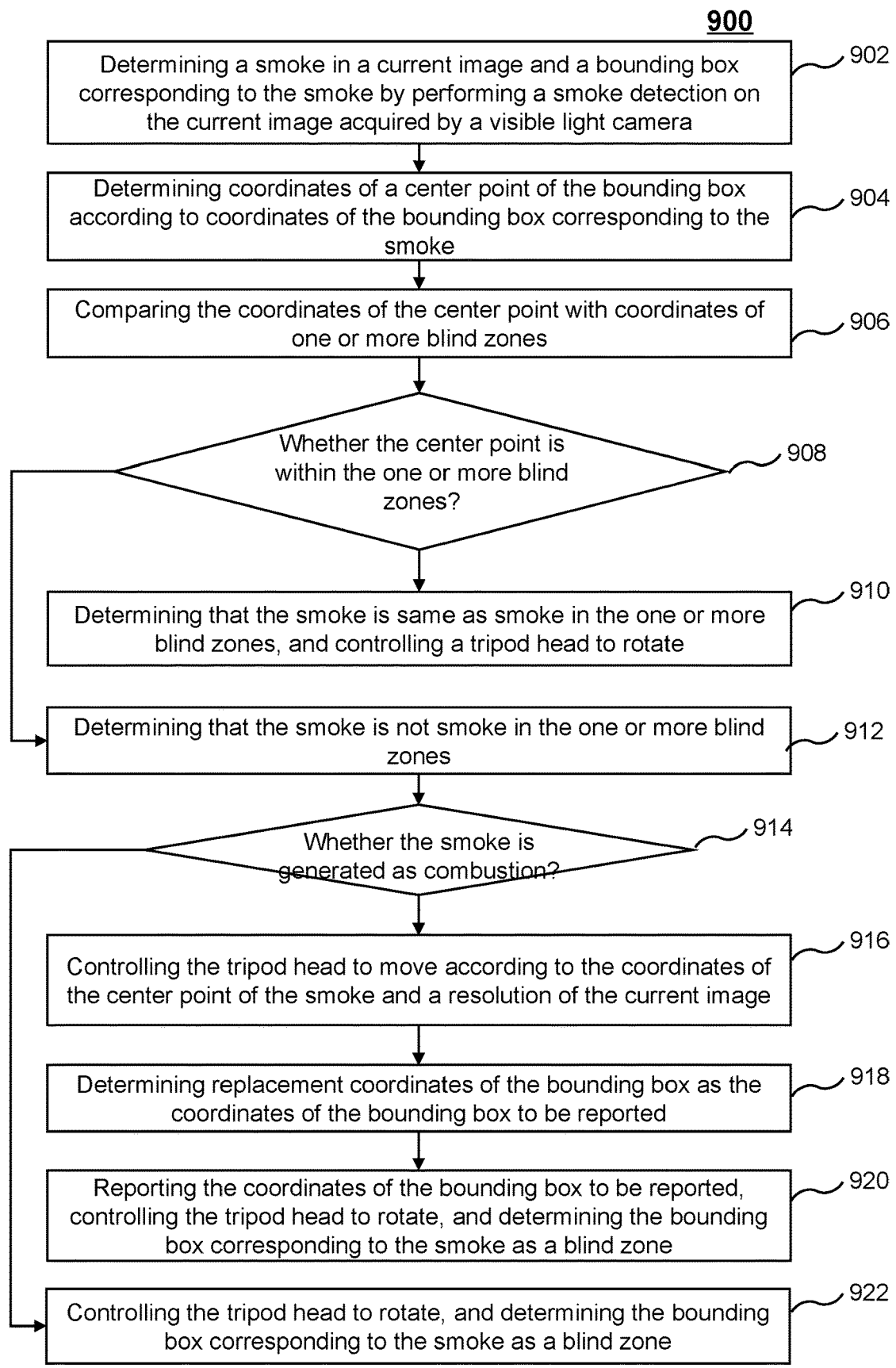
FIG. 9 is a flowchart illustrating another exemplary process for smoke detection according to some embodiments of the present disclosure.

FIG. 9 is a flowchart illustrating another exemplary process for smoke detection according to some embodiments of the present disclosure. In some embodiments, process 900 may be executed by the detection system 100. For example, the process 900 may be implemented as a set of instructions (e.g., an application) stored in a storage device (e.g., the storage device 150, the ROM 223, the RAM 221, and/or the storage 390). In some embodiments, the processing device 112 (e.g., the processor 201 of the computing device 200, the CPU 340 of the mobile device 300, and/or one or more modules illustrated in FIG. 4) may execute the set of instructions and may accordingly be directed to perform the process 900. The operations of the illustrated process presented below are intended to be illustrative. In some embodiments, the process 900 may be accomplished with one or more additional operations not described and/or without one or more of the operations discussed. Additionally, the order of the operations of process 500 illustrated in FIG. 9 and described below is not intended to be limiting.

In 902, the processing device 120 (e.g., the determination module 420) may determine a smoke (i.e., a first subject) in a current image and a bounding box corresponding to the smoke by performing a smoke detection on the current image acquired by a visible light camera (e.g., the first imaging component 161). In some embodiments, the smoke may be enclosed by the bounding box.

In 904, the processing device 120 (e.g., the determination module 420) may determine coordinates of a center point of the bounding box according to position coordinates of the bounding box corresponding to the smoke.

In 906, the processing device 120 (e.g., the determination module 420) may compare the coordinates of the center point with coordinates of one or more blind zones. For example, the processing device 120 may determine equivalent coordinates of the center point (i.e., a reference point) of the bounding box (also referred as to an offset center point) according to Equation (3) and (4) as described in FIG. 6A. The coordinates of the center point may include the equivalent coordinates of the center point. The equivalent coordinates of the center point refer to coordinates of the center point in the current image when the current image is acquired by the first imaging component with position parameters for acquiring the previous image (i.e., coordinates of the center point in the previous image). The processing device 120 may compare the equivalent coordinates of the center point with the coordinates of the one or more blind zones in the previous image. As another example, the processing device 120 may determine equivalent coordinates of the one or more blind zones in the previous image. The coordinates of the one or more blind zones may include the equivalent coordinates of the one or more blind zones. The equivalent coordinates of the one or more blind zones refer to coordinates of the one or more blind zones in the previous image when the previous image is acquired by the first imaging component with position parameters for acquiring the current image (i.e., coordinates of the one or more blind zones in the current image). For example, the processing device 120 may determine equivalent coordinates of a blind zone (e.g., equivalent coordinates of points of the vertex points of the blind zone, equivalent coordinates of points in the blind zone) according to Equation (5) and (6) as described in FIG. 6A. The processing device 120 may compare the coordinates of the center point of the smoke in the current image with the equivalent coordinates of the one or more blind zones.

For one of the one or more blind zones, the coordinates of the blind zone may be offset, by a difference between position coordinates of a trip tripod head (e.g., the moveable component 163) when the current image is acquired and coordinates of the trip tripod head when the previous image is acquired, so as to obtain the coordinates of the blind zone in the current image. The coordinates of the blind zone in the current image may be determined as the coordinates of the blind zone. For example, for one of the one or more blind zones, a distance to be moved in a horizontal direction of the blind zone may be determined according to the difference between a horizontal coordinate of the trip tripod head when the current image is acquired and a horizontal coordinate of the trip tripod head when the previous image is acquired and current parameter information. The current parameter information may include a current field of view of the visible light camera and horizontal pixels of the current image. A distance to be moved in a vertical direction of the blind zone may be determined according to the difference between a vertical coordinate of the trip tripod head when the current image is acquired and a vertical coordinate of the trip tripod head when the previous image is acquired and current parameter information. The blind zone may be moved according to the distance to be moved in the horizontal direction of the blind zone and the distance to be moved in the vertical direction of the blind zone. Therefore, the coordinates of the blind zone in the current image may be determined as the coordinates of the blind zone.

Therefore, the comparison may be performed by offsetting the position coordinates of the center point of the bounding box or offsetting the coordinates of the blind zone, which may improve the accuracy of the comparison.

In 908, the processing device 120 (e.g., the determination module 420) may determine whether the center point is within the one or more blind zones based on a comparison result. If the center point is within the one or more blind zones, the processing device 120 may perform operation 910. If the center point is not within the one or more blind zones, the processing device 120 may perform operation 912.

In 910, the processing device 120 (e.g., the determination module 420) may determine that the smoke is the same as smoke in the one or more blind zones, and control the tripod head (e.g., the moveable component 163) to rotate.

It should be noted that when it is determined that the smoke in the current image is different from each smoke in the one or more blind zones, the smoke out of the one or more blind zones may be further detected. In addition, the coordinates of the bounding box corresponding to the smoke in the one or more blind zones may be replaced with the position coordinates of the one or more blind zones. Therefore, the position coordinates of the one or more blind zones may be more accurate.

By adding the bounding box corresponding to the reported smoke in the previous image acquired before the current image and/or the bounding box corresponding to the smoke that is not smoke of combustion in the previous image acquired before the current image as the one or more blind zones, when smoke is detected in the current image, the bounding box of the smoke may be compared with the one or more blind zones to determine whether the detected smoke is smoke in the one or more blind zones. If the smoke is the same as the smoke in one or more blind zones, the tripod head may be controlled to rotate, thereby avoiding a repeated detection and improving the efficiency of the smoke detection.

Figure 8:
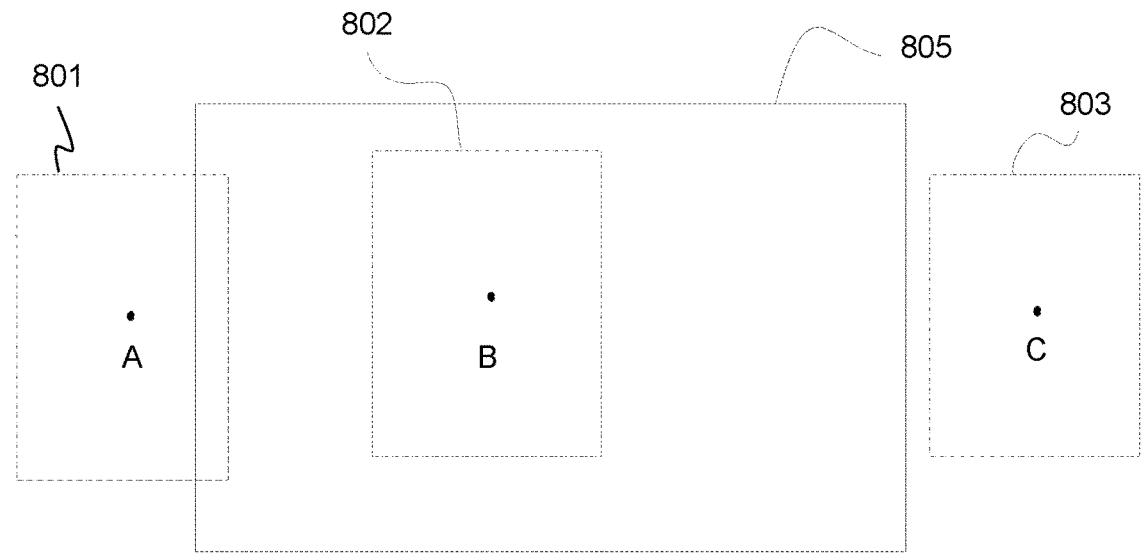
FIG. 8 is a schematic diagram illustrating an exemplary process for updating a target region according to some embodiments of the present disclosure.

To avoid occupying memory, in some embodiments, the coordinates of the bounding box of the current image may be determined. For one of the one or more blind zones, the coordinates of the center point of the blind zone may be used to determine whether the blind zone is within the bounding box of the current image. If the coordinates of the center point of the blind zone is not within the bounding box of the current image, the blind zone may be deleted. Referring to FIG. 8, FIG. 8 is a schematic diagram illustrating an exemplary process for updating a target region according to some embodiments of the present disclosure. As shown in FIG. 8, a region 805 is a first target region of a current image (e.g., the current image as described in FIG. 5, FIG. 6A, and FIG. 6B). Regions 801, 802, and 803 are second target regions of second subjects (e.g., the one or more second subjects as described in FIG. 5, FIG. 6A, and FIG. 6B). As used herein, points A, B, and C are reference points of the regions 801, 802, and 803, respectively. The processing device 112 may determine whether each of the reference points is within region 805. Since the processing device, 112 determines that points A and C are not within region 805 and point B is within region 805, the processing device 112 may determine that a subject represented by region 805 and a subject represented by region 802 belong to the same object. The processing device 112 may further remain the region 802 and remove regions 801 and 803.

In 912, the processing device 120 (e.g., the determination module 420) may determine that the smoke is different from each smoke or not smoke in the one or more blind zones.

In 914, the processing device 120 (e.g., the determination module 420) may determine whether the smoke is generated as combustion using a thermal imaging camera (e.g., the second imaging component 162). If the smoke is generated as combustion, the processing device 120 may perform operation 916. If the smoke is not generated as combustion, the processing device 120 may perform operation 922.

In 916, the processing device 120 (e.g., the determination module 420) may control the tripod head (e.g., the moveable component 163) to move according to the coordinates of the center point of the smoke (i.e., the center point of the bounding box) and a resolution of the current image. The processing device 120 may cause the first imaging component to acquire a replacement image of the smoke for replacing the current image after the tripod head moves, and the smoke is at the center of the replacement image. The processing device 120 may further determine replacement coordinates of the bounding box in the replacement image when the smoke is at the center of the replacement image.

In 918, the processing device 120 (e.g., the determination module 420) may determine the replacement coordinates of the bounding box as the coordinates of the bounding box that needs to be reported.

In 920, the processing device 120 (e.g., the determination module 420) may report the coordinates of the bounding box, control the tripod head to rotate, and determine the bounding box corresponding to the smoke as a blind zone.

In 922, the processing device 120 (e.g., the determination module 420) may control the tripod head to rotate and determine the bounding box corresponding to the smoke as a blind zone.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or colocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for smoke detection using an object detection device, the object detection device including a first imaging component and a moveable component configured to move the first imaging component, comprising:
    at least one storage device including a set of instructions; and
    at least one processor in communication with the at least one storage device, wherein when executing the set of instructions, the at least one processor is directed to perform operations including:
        obtaining a current image of a first subject acquired by the first imaging component at a current time;
        determining whether the first subject and a second subject among one or more second subjects belong to a same object, the one or more second subjects being represented in one or more previous images acquired by the first imaging component at a previous time;
        in response to determining that the first subject and the one of the one or more second subjects belong to the same object, causing the moveable component to move the first imaging component; and
        in response to determining that the first subject and the second subject belong to different subjects, stopping the moveable component to move the first imaging component.

2. The system of claim 1, wherein the determining whether the first subject and the second subject belong to the same object includes:
    determining one or more target regions in the previous image, the one or more target regions including the one or more second subjects; and
    determining whether the first subject and the second subject belong to the same object based on the one or more target regions.

3. The system of claim 2, wherein the determining whether the first subject and the second subject of the one or more second subjects belong to the same object based on the one or more target regions includes:
  determining first position information of a reference point represented the first subject in the current image, the first position information corresponding to current position parameters of the first imaging component acquiring the current image;
  determining second position information of each of the one or more target regions represented one second subject in the previous image, the second position information corresponding to previous position parameters of the first imaging component acquiring the previous image; and
  determining whether the first subject and the second subject belong to the same object based on the first position information and the second position information.

4. The system of claim 3, wherein the determining whether the first subject and the second subject belong to the same object based on the first position information and the second position information includes:
  determining equivalent first position information of the reference point, the equivalent first position information including position information of the reference point if the current image is acquired at the previous position parameters; and
  determining whether the first subject and the second subject belong to the same object by determining whether the reference point is within one of the one or more target regions based on the equivalent first position information and the second position information.

5. The system of claim 4, wherein the determining equivalent first position information of the reference point includes:
  determining a difference between the current position parameters and the previous position parameters; and
  determining the equivalent first position information of the reference point based on the difference between the current position parameters and the previous position parameters.

6. The system of claim 3, wherein the determining whether the first subject and the second subject of the one or more second subjects belong to the same object based on the first position information and the second position information includes:
  determining equivalent second position information of the one or more target regions, the equivalent second position information including position information of the one or more target regions if the previous image is acquired at the current position parameters; and
  determining whether the first subject and the second subject belong to the same object by determining whether the reference point is within one of the one or more target regions based on the equivalent second position information and the first position information.

7. The system of claim 6, wherein the determining equivalent second position information includes:
  determining a difference between the current position parameters and the previous position parameters; and
  determining the equivalent second position information of the one or more target regions based on the difference between the current position parameters and the previous position parameters.

8. The system of claim 3, wherein the determining whether the first subject and the second subject of the one or more second subjects belong to the same object based on the first position information and the second position information includes:
  determining first spatial position information under a reference coordinate system by converting the first position information under a first coordinate system to the reference coordinate system;
  determining second spatial position information under the reference coordinate system by converting the second position information under a second coordinate system to the reference coordinate system; and
  determining whether the first subject and the second subject belong to the same object by determining whether the reference point is within one of the one or more target regions based on the first spatial position information and the second spatial position information.

9. The system of claim 1, wherein the operations further include:
  in response to determining that the first subject and the second subject belongs to different subjects,
    obtaining a second image of the first subject acquired by a second imaging component of the object detection device, the second image including temperature information of the first subject;
    determining, based on the second image, whether the first subject is smoke of a combustion;
    in response to determining that the first subject is smoke of the combustion, reporting first position information of the first object and the current position parameters.

10. The system of claim 1, wherein the operations further include:
  causing the moveable component to move the first imaging component after a second image of the first subject is acquired by the second imaging component.

11. The system of claim 1, wherein the operations further include:
  in response to determining that the first subject and the second subject belong to different subjects, adding the first subject into the one or more second subjects.

12. The system of claim 1, wherein the operations further include:
  in response to determining that the first subject and the second subject belong to the same object, updating second position information of the second subject using first position information of the first subject.

13. A method for smoke detection using an object detection device, the object detection device including a first imaging component and a moveable component configured to move the first imaging component, comprising:
  obtaining a current image of a first subject acquired by the first imaging component at a current time;
  determining whether the first subject and a second subject among one or more second subjects belong to a same object, the one or more second subjects being represented in one or more previous images acquired by the first imaging component at a previous time; and
  in response to determining that the first subject and the one of the one or more second subjects belong to the same object, causing the moveable component to move the first imaging component; and
  in response to determining that the first subject and the second subject belong to different subjects, stopping the moveable component to move the first imaging component.

14. The method of claim 13, wherein the determining whether the first subject and the second subject belong to the same object includes:
- determining one or more target regions in the previous image, the one or more target regions including the one or more second subjects; and
- determining whether the first subject and the second subject belong to the same object based on the one or more target regions.

15. The method of claim 14, wherein the determining whether the first subject and the second subject of the one or more second subjects belong to the same object based on the one or more target regions includes:
- determining first position information of a reference point represented the first subject in the current image, the first position information corresponding to current position parameters of the first imaging component acquiring the current image;
- determining second position information of each of the one or more target regions represented one second subject in the previous image, the second position information corresponding to previous position parameters of the first imaging component acquiring the previous image; and
- determining whether the first subject and the second subject belong to the same object based on the first position information and the second position information.

16. The method of claim 15, wherein the determining whether the first subject and the second subject belong to the same object based on the first position information and the second position information includes:
- determining equivalent first position information of the reference point, the equivalent first position information including position information of the reference point if the current image is acquired at the previous position parameters; and
- determining whether the first subject and the second subject belong to the same object by determining whether the reference point is within one of the one or more target regions based on the equivalent first position information and the second position information.

17. The system of claim 13, wherein the method further includes:
- in response to determining that the first subject and the second subject belong to the same object, updating second position information of the second subject using first position information of the first subject.

18. A non-transitory computer readable medium, comprising executable instructions that, when executed by at least one processor, direct the at least one processor to perform a method for smoke detection using an object detection device, the object detection device including a first imaging component and a moveable component configured to move the first imaging component, the method comprising:
- obtaining a current image of a first subject acquired by the first imaging component at a current time;
- determining whether the first subject and a second subject among one or more second subjects belong to a same object, the one or more second subjects being represented in one or more previous images acquired by the first imaging component at a previous time; and
- in response to determining that the first subject and the one of the one or more second subjects belong to the same object, causing the moveable component to move the first imaging component; and
- in response to determining that the first subject and the second subject belong to different subjects, stopping the moveable component to move the first imaging component.

* * * * *